United States Patent
Okada et al.

(10) Patent No.: US 11,180,378 B2
(45) Date of Patent: Nov. 23, 2021

(54) HEAT RAY SHIELDING FINE PARTICLE DISPERSION BODY, HEAT RAY SHIELDING LAMINATED TRANSPARENT SUBSTRATE, AND METHOD FOR PRODUCING THE SAME

(71) Applicant: SUMITOMO METAL MINING CO., LTD., Tokyo (JP)

(72) Inventors: Mika Okada, Isa (JP); Hideaki Fukuyama, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/310,791

(22) PCT Filed: Jun. 14, 2017

(86) PCT No.: PCT/JP2017/021982
§ 371 (c)(1),
(2) Date: Dec. 17, 2018

(87) PCT Pub. No.: WO2017/217459
PCT Pub. Date: Dec. 21, 2017

(65) Prior Publication Data
US 2019/0185340 A1   Jun. 20, 2019

(30) Foreign Application Priority Data

Jun. 15, 2016   (JP) .............................. JP2016-119125

(51) Int. Cl.
| C01G 41/00 | (2006.01) |
|---|---|
| C08K 3/22 | (2006.01) |
| C08L 101/12 | (2006.01) |
| C09K 3/00 | (2006.01) |
| C08L 33/12 | (2006.01) |
| C08L 69/00 | (2006.01) |

(52) U.S. Cl.
CPC ........... *C01G 41/006* (2013.01); *C01G 41/00* (2013.01); *C08K 3/22* (2013.01); *C08L 33/12* (2013.01); *C08L 69/00* (2013.01); *C08L 101/12* (2013.01); *C09K 3/00* (2013.01); *C01P 2002/72* (2013.01); *C01P 2004/64* (2013.01); *C01P 2006/22* (2013.01); *C01P 2006/32* (2013.01); *C08K 2003/2244* (2013.01); *C08K 2201/014* (2013.01)

(58) Field of Classification Search
None
See application file for complete search history.

(56) References Cited

U.S. PATENT DOCUMENTS

| 6,060,154 A | 5/2000 | Adachi et al. |
|---|---|---|
| 6,315,848 B1 | 11/2001 | Kondo |
| 6,579,608 B1 | 6/2003 | Kondo |
| 10,308,801 B2 | 6/2019 | Machida et al. |
| 2001/0016261 A1* | 8/2001 | Kondo .................. B01D 61/44 |
| | | 428/426 |
| 2011/0248225 A1 | 10/2011 | Mamak et al. |

FOREIGN PATENT DOCUMENTS

| CN | 104 828 868 A | 8/2015 |
|---|---|---|
| JP | H02-136230 A | 5/1990 |
| JP | H08-259279 A | 10/1996 |
| JP | H11-181336 A | 7/1999 |
| JP | 2006-299086 A | 11/2006 |
| JP | 2008-231164 A | 10/2008 |
| JP | 2011-063493 A | 3/2011 |
| JP | 2011-065000 A | 3/2011 |
| JP | 2012-532822 A | 12/2012 |
| WO | 2005/037932 A1 | 4/2005 |
| WO | 2014/192676 A1 | 12/2014 |

OTHER PUBLICATIONS

Aug. 8, 2017 International Search Report issued in International Patent Application No. PCT/JP2017/021982.
Dec. 6, 2019 Extended Search Report issued in European Patent Application No. 17813354.2.

* cited by examiner

*Primary Examiner* — Robert T Butcher
(74) *Attorney, Agent, or Firm* — Oliff PLC

(57) ABSTRACT

A heat ray shielding fine particle dispersion body and a heat ray shielding laminated transparent substrate that as well as exhibit heat ray shielding properties and suppressing a scorching sensation on the skin when used in structures such as window materials and the like, also enable usage of communication devices, imaging devices, sensors and the like that use near-infrared light interposing the heat ray shielding film or the heat ray shielding glass, containing a transparent thermoplastic resin, and wherein heat ray shielding fine particles are dispersed in the transparent thermoplastic resin, the heat ray shielding fine particles having elements L, M, tungsten, and oxygen, and a hexagonal crystal structure represented by a general formula $(L_A M_B) W_C O_D$, wherein the element L is an element selected from K, Rb, Cs, and the element M is one or more elements selected from K, Rb, and Cs and is different from the element L.

14 Claims, 4 Drawing Sheets

HEAT RAY SHIELDING FINE PARTICLE DISPERSION BODY, HEAT RAY SHIELDING LAMINATED TRANSPARENT SUBSTRATE, AND METHOD FOR PRODUCING THE SAME

TECHNICAL FIELD

The present invention relates to a heat ray shielding fine particle dispersion body and a heat ray shielding laminated transparent substrate having good visible light transparency, and transmitting near-infrared light of a predetermined wavelength while exhibiting an excellent heat ray shielding function, and a method for producing the same.

DESCRIPTION OF RELATED ART

Hitherto various techniques have been proposed as heat ray shielding techniques to lower the solar transmittance, while maintaining transparency with a good visible light transmittance. From among them, heat ray shielding techniques using conductive fine particles, a dispersion body of conductive fine particles, or a laminated transparent substrate, have merits such as excellent heat ray shielding properties and low cost compared to other techniques, transparency to radio waves, and moreover high weather resistance.

For example, patent document 1 discloses a transparent resin containing tin oxide fine powder in a dispersed state, and an infrared absorptive synthetic resin molded product obtained by molding a transparent synthetic resin containing tin oxide fine powder in a dispersed state into a sheet or a film, which is then laminated onto a transparent synthetic resin substrate.

Patent document 2 proposes a laminated glass in which an intermediate layer is sandwiched between at least two opposing glass sheets, the intermediate layer having dispersed therein a metal such as Sn, Ti, Si, Zn, Zr, Fe, Al, Cr, Co, Ce, In, Ni, Ag, Cu, Pt, Mn, Ta, W, V, and Mo, a metal oxide thereof, a metal nitride thereof, a metal sulfide thereof, one of these metals doped with a dopant of Sb or F, or a mixture thereof.

Further, the applicant has disclosed in patent document 3 a selectively transmissive layer coating solution having dispersed therein at least one kind of fine particle from out of titanium nitride fine particles and lanthanum boride fine particles, and a selectively transmissive layer thereof.

However, heat ray shielding structures disclosed in patent documents 1 to 3, such as the infrared absorptive synthetic resin molded product, all involve a problem of insufficient heat ray shielding performance when a high visible light transmittance is required. For example, as examples of specific numerical values of heat ray shielding performance possessed by the heat ray shielding structures disclosed in patent documents 1 to 3, when the visible light transmittance computed in accordance with JIS R 3106 (sometimes referred to simply as "visible light transmittance" in the present invention) was 70%, the solar transmittance similarly computed in accordance with JIS R 3106 (sometimes referred to simply as "solar transmittance" in the present invention) exceeded 50%.

Therefore, the applicant has disclosed in patent document 4 a heat ray shielding dispersion body that is an infrared shielding material fine particle dispersion body produced by dispersing infrared shielding material fine particles in a medium. The infrared shielding material fine particles contain composite tungsten oxide fine particles represented by the formula $M_xW_yO_z$, wherein: element M is at least element selected from out of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$; and $2.2 \leq z/y \leq 3.0$. The composite tungsten oxide fine particles include at least one kind of fine particles from out of fine particles having a hexagonal, tetragonal, or cubic crystal structure, and a particle size of the infrared shielding material fine particles is from 1 nm to 800 nm.

As disclosed in patent document 4, the heat ray shielding dispersion body employing the composite tungsten oxide fine particles represented by the formula $M_xW_yO_z$ exhibits high heat ray shielding performance, and is improved such that when the visible light transmittance is 70%, the solar transmittance is less than 50%. A heat ray shielding fine particle dispersion body employing composite tungsten oxide fine particles that employ at least an element selected from specific elements of Cs, Rb, Tl, and the like as the element M and that have a hexagonal crystal structure exhibit outstanding heat ray shielding performance, and are improved such that when the visible light transmittance is 70%, the solar transmittance is less than 37%.

Moreover, the applicant has disclosed in patent document 5 an ultraviolet/near-infrared light shielding dispersion body containing composite tungsten oxide fine particles that are represented by the formula $M_aWO_c$ (wherein: $0.001 \leq a \leq 1.0$; $2.2 \leq c \leq 3.0$; and element M is one or more elements selected from Cs, Rb, K, Tl, In, Ba, Li, Ca, Sr, Fe, and Sn) and that have a hexagonal crystal structure. The powder color of the composite tungsten oxide represented by the formula $M_aWO_c$ as evaluated in L*a*b* color space is L* from 25 to 80, a* from −10 to 10, and b* from −15 to 15.

RELATED ART DOCUMENTS

Patent Documents

[Patent document 1] Japanese Unexamined Patent Publication No. 1990-136230
[Patent document 2] Japanese Unexamined Patent Publication No. 1996-259279
[Patent document 3] Japanese Unexamined Patent Publication No. 1999-181336
[Patent document 4] International Publication (WO) No. 2005/037932
[Patent document 5] Japanese Unexamined Patent Publication No. 2008-231164

SUMMARY OF THE INVENTION

Problem to be Solved by the Invention

A new problem has been found as a result of an expanded range of markets using the composite tungsten oxide fine particles represented by the formula $M_xW_yO_z$ and heat ray shielding film, heat ray shielding glass, heat ray shielding fine particle dispersion body and laminated transparent substrate using the composite tungsten oxide fine particles.

This problem is that when composite tungsten oxide fine particles represented by the formula $M_xW_yO_z$, and heat ray shielding film and heat ray shielding glass containing such composite tungsten oxide fine particles, and dispersion body and heat ray shielding laminated transparent substrate containing such composite tungsten oxide fine particles, are applied to structures such as window materials and the like, for light passing through such window materials and the like there is a large decrease in the transmittance of near-infrared light in the wavelength region from 700 nm to 1200 nm.

Near-infrared light in such a wavelength region is substantially invisible to the human eye, and due to also being transmittable by an inexpensive light source such as a near-infrared LED or the like, near-infrared light is widely utilized for communication, imaging devices, sensors, and the like. However, structures such as window materials and the like, heat ray shielding body and heat ray shielding substrate, and structures such as dispersion body and laminated transparent substrate and the like that employ the composite tungsten oxide fine particles represented by the formula $M_xW_yO_z$ also strongly absorb near-infrared light in such a wavelength region, together with absorbing heat rays.

This sometimes results in limitations being placed to usage of communication, imaging devices, sensors, and the like that use near-infrared light across structures such as window materials and the like, heat ray shielding film and heat ray shielding glass, and dispersion body and laminated transparent substrate that employ the composite tungsten oxide fine particles represented by the formula $M_xW_yO_z$.

For example, when a heat ray shielding film employing the composite tungsten oxide fine particles disclosed in patent document 4 is stuck onto the windows of ordinary housing, this interferes with communication by near-infrared light between infrared transmitters placed indoors and intrusion detectors configured from infrared receivers placed outdoors, such that the devices did not operate normally.

Despite the presence of such problems, heat ray shielding film and structures such as window materials and the like, dispersion body and heat ray shielding laminated transparent substrate that employ composite tungsten oxide fine particles and the like exhibit a high degree of heat ray cutting performance, and the usage of heat ray shielding has expanded in favorable markets. However, using such heat ray shielding film and structures such as window materials, dispersion body and heat ray shielding laminated transparent substrate means that wireless communication, imaging devices, sensors, and the like that use near-infrared light are not able to be used.

In addition, composite tungsten oxide fine particles represented by the formula $M_xW_yO_z$, and heat ray shielding film, heat ray shielding glass, heat ray shielding fine particle dispersion body and laminated transparent substrate employing such composite tungsten oxide fine particles, have not provided adequate shielding of heat rays at a wavelength of 2100 nm.

For example, when a heat ray shielding film employing the composite tungsten oxide fine particles disclosed in patent document 4 is stuck onto the windows of ordinary housing, a scorching heat was still felt on the skin indoors.

In view of the above circumstances, the present invention is configured as follows. In order to solve this problem, heat ray shielding fine particles, a heat ray shielding fine particle dispersion body containing the heat ray shielding fine particles, a heat ray shielding laminated transparent substrate and a method for producing the same are provided, thereby as well as exhibiting heat ray shielding properties and suppressing a scorching sensation on the skin when used in structures such as window materials and the like, also enabling usage of communication devices, imaging devices, sensors, and the like that employ near-infrared light across these structures, the heat ray shielding film or heat ray shielding glass, the dispersion body and the laminated transparent substrate.

Means for Solving the Problem

The inventors of the present invention have performed various investigations to solve the above problem.

For example, it was thought that to enable the usage of communication devices, imaging devices, sensors and the like employing near-infrared light even across a heat ray shielding film, a heat ray shielding glass, a heat ray shielding dispersion body, and a heat ray shielding laminated transparent substrate, it would be sufficient to raise the transmittance for near-infrared light in the wavelength region from 800 nm to 900 nm. Then, in order to simply raise the transmittance of near-infrared light in such a wavelength region, is was thought that it would be sufficient to appropriately reduce the in-layer concentration of the composite tungsten oxide fine particles, the concentration of composite tungsten oxide fine particles in the heat ray shielding film and the heat ray shielding glass, and the in-layer concentration of the composite tungsten oxide fine particles in the heat ray shielding dispersion body and the heat ray shielding laminated transparent substrate.

However, when the concentration of the composite tungsten oxide fine particles and the in-layer concentration of composite tungsten oxide fine particles in the heat ray shielding dispersion body and the heat ray shielding laminated transparent substrate were reduced, there was also at the same time a reduction of a heat ray absorption ability, with transmittance being at a bottom in a wavelength region from 1200 nm to 1800 nm, causing a reduction in the heat ray shielding effect, and resulting in a scorching sensation also being felt on the skin.

It is thought that in sunlight it is the heat rays with wavelengths from 1500 nm to 2100 nm that greatly influence the scorching sensation on the skin (see, for example, Proceedings of Society of Automotive Engineers of Japan No. 33-99, 13 (1999) by OZEKI Yoshiichi et. al.). This is thought to be because although human skin only has a small absorbance for near-infrared light in the wavelength region from 700 nm to 1200 nm, human skin has a large absorbance for wavelengths from 1500 nm to 2100 nm.

Based on the above knowledge, and as a result of their various investigations, the inventors of the present invention have focused on the following point: in the composite tungsten oxide fine particles represented by the general formula $N_BW_CO_D$, its near-infrared absorption capability is constituted of two kinds of elements, plasmon resonance absorption and polaron absorption. Then, it is found that a wavelength region of the near-infrared light absorbed by the two kinds of constituent elements is different. The present inventors achieve a revolutionary structure in which a polaron absorption power is controlled while maintaining the plasmon resonance absorption in the composite tungsten oxide fine particles.

The following structure is also found: instead of element N in the composite tungsten oxide represented by the general formula $N_BW_CO_D$, two or more elements L and M are selected from K, Rb, Cs, and by controlling a blending ratio of the two or more elements L and M, the polaron absorption of the composite tungsten oxide fine particles is controlled.

Specifically, since a near-infrared absorption band of the composite tungsten oxide fine particles is constituted of the plasmon resonance absorption with the bottom at a wavelength of 1200 to 1800 nm and the polaron absorption at a wavelength of 700 to 1200 nm region, the present inventors obtain a knowledge that by controlling the polaron absorption power while maintaining the plasmon resonance absorption, the absorption in the wavelength of 800 to 900 nm is controlled while maintaining the heat ray absorption capacity with the bottom in the wavelength region of 1200 to 1800 nm, and it is possible to obtain the composite tungsten oxide fine particles with improved absorption capability in the region of wavelength of 2100 nm.

However, the present inventors are concerned about the following point: the composite tungsten oxide fine particles with improved transmittance of near-infrared light in the wavelength region of 800 to 900 nm by controlling the polaron absorption capability, is inferior to the conventional composite tungsten oxide, When evaluated by using an index conventionally used as an evaluation standard of a heat ray shielding performance in the heat ray shielding fine particle dispersion body (for example, solar radiation transmittance compared to visible light transmittance evaluated in JIS R 3106).

Therefore, from this viewpoint, the composite tungsten oxide fine particles with improved transmittance of near infrared light in the wavelength of 800 to 900 nm were further investigated by controlling the polaron absorption power.

Then, it is found that the composite tungsten oxide fine particles with improved transmittance of near-infrared light in the wavelength of 800 to 900 nm by controlling the polaron absorption power as described above, are not inferior in performance as heat ray shielding fine particles, compared to the conventional composite tungsten oxide fine particles.

This is because in the composite tungsten oxide fine particles with improved transmittance of near-infrared light in the wavelength of 800 to 900 nm by controlling the polaron absorption power, although an absolute value of the plasmon absorption is decreased, transmittance with visible light is increased, the concentration of the composite tungsten oxide fine particles per unit area can be increased, and transmission of heat rays at a wavelength of 1500 to 2100 nm can be suppressed.

As a result of the above-described investigation, the present inventors achieve the composite tungsten oxide fine particles having a heat ray shielding function, having elements L, M, tungsten, and oxygen, represented by the general formula $(L_AM_B) W_CO_D$, and having a hexagonal crystal structure. Thus, the present invention is completed.

Wherein, the element L is an element selected from K, Rb, Cs, and the element M is one or more elements selected from K, Rb, Cs and is different from the element L.

Further, the present inventors obtain a knowledge that also in the heat ray shielding material, the heat ray shielding fine particle dispersion body, and the laminated transparent substrate using the composite tungsten oxide fine particles of the present invention, the performance as a heat ray shielding body is not inferior, and also from the viewpoint of suppressing the scorching sensation to skin, it is equivalent to the composite tungsten oxide fine particles of the conventional technique. Thus, the present invention is completed.

Namely, in order to solve the above-described problem a first invention is a heat ray shielding fine particle dispersion body containing a transparent thermoplastic resin, and in which heat ray shielding fine particles are dispersed in the transparent thermoplastic resin, the heat ray shielding fine particles having elements L, M, tungsten, and oxygen, and a hexagonal crystal structure represented by a general formula $(L_AM_B) W_CO_D$, wherein the element L is an element selected from K, Rb, Cs, and the element M is one or more elements selected from K, Rb, and Cs and is different from the element L.

a second invention is the heat ray shielding fine particle dispersion body of the first invention, containing heat ray shielding fine particles in which when a visible light transmittance is 85% when computed for light absorption by the heat ray shielding fine particles alone, an average value of transmittance at a wavelength of 800 nm to 900 nm is 30% or more and 60% or less, and an average value of transmittance at a wavelength of 1200 nm to 1500 nm is 20% or less, and a transmittance at a wavelength of 2100 nm is 22% or less.

A third invention is the heat ray shielding fine particle dispersion body of the first or second invention, wherein the transparent thermoplastic resin is any one of:

one resin selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene-vinyl acetate copolymer, polyvinyl acetal resin, a mixture of two or more resins selected from the above resin group, or a copolymer of two or more resins selected from the above resin group.

A fourth invention is the heat ray shielding fine particle dispersion body of any one of the first to third inventions, wherein a content of the heat ray shielding fine particles is 0.5 mass % or more and 80 mass % or less.

A fifth invention is the heat ray shielding fine particle dispersion body of any one of the first to fourth inventions, wherein the heat ray shielding fine particle dispersion body is formed in a sheet shape, a board shape, or a film shape.

A sixth invention is the heat ray shielding fine particle dispersion body of any one of the first to fifth inventions, wherein a content of the heat ray shielding fine particles contained in the heat ray shielding fine particle dispersion body per unit projected area is 0.1 g/m$^2$ or more and 5.0 g/m$^2$ or less.

A seventh invention is the heat ray shielding fine particle dispersion body of any one of the first to sixth inventions, wherein when a visible light transmittance is 70%, an average value of transmittance at a wavelength of 800 nm to 900 nm is 10% or more and 45% or less, and an average value of transmittance at a wavelength of 1200 nm to 1500 nm is 8% or less, and a transmittance at a wavelength of 2100 nm is 5% or less.

An eighth invention is a heat ray shielding laminated transparent substrate, wherein the heat ray shielding fine particle dispersion body of any one of the first to seventh inventions is present between a plurality of transparent substrates.

A ninth invention is the heat ray shielding laminated transparent substrate of the eighth invention, wherein when a visible light transmittance is 70%, an average value of transmittance at a wavelength of 800 nm to 900 nm is 10% or more and 45% or less, and an average value of transmittance at a wavelength of 1200 nm to 1500 nm is 8% or less, and transmittance at a wavelength of 2100 nm is 8.0% or less.

A tenth invention is a method for producing a heat ray shielding fine particle dispersion body including a step of obtaining a heat ray shielding fine particle dispersion body by uniformly mixing heat ray shielding fine particles in a transparent thermoplastic resin, the heat ray shielding fine particles having elements L, M, tungsten, and oxygen, and a hexagonal crystal structure represented by a general formula $(L_A M_B) W_C O_D$, wherein the element L is an element selected from K, Rb, Cs, and the element M is one or more elements selected from K, Rb, and Cs and is different from the element L.

An eleventh invention is a method for producing a heat ray shielding laminated transparent substrate, including a step of sandwiching the heat ray shielding fine particle dispersion body between transparent substrates, the heat ray shielding fine particle dispersion body being produced by the method of the tenth invention.

A twelfth invention is a method for producing a heat ray shielding laminated transparent substrate, including a step of molding the heat ray shielding fine particle dispersion body produced by the method of the tenth invention, into a film shape or a board shape.

Advantage of the Invention

The heat ray shielding fine particle dispersion body or the heat ray shielding laminated transparent substrate of the present invention exhibits heat ray shielding properties, suppresses a scorching sensation on the skin, and enables usage of communication devices, imaging devices, sensors and the like that use near-infrared light even when interposing the above structure, etc.

DETAILED DESCRIPTION OF THE INVENTION

Figure 1:
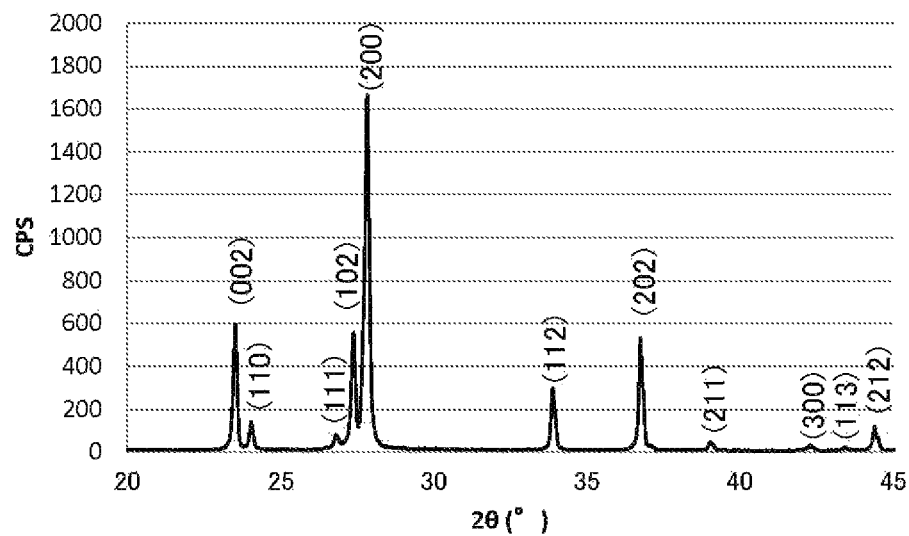
FIG. 1 is an X-ray diffraction profile of powder A according to example 1.

Explanation follows, in sequence, regarding embodiments for implementing the present invention, under the headings [a] Heat ray shielding fine particles, [b] Method for producing heat ray shielding fine particles, [c] Method for producing a heat ray shielding fine particle dispersion body, [d] Method for producing a heat ray shielding laminated transparent substrate.

[a] Heat Ray Shielding Fine Particles
(Composite Tungsten Oxide Fine Particles)

The heat ray shielding fine particles of the present invention are composite tungsten oxide fine particles having elements L, M, tungsten, and oxygen, represented by a general formula $(L_A M_B) W_C O_D$, and having a hexagonal crystal structure, wherein the element L is an element selected from K, Rb, Cs, and the element M is one or more elements selected from K, Rb, and Cs and is different from the element L. Specifically, as elements L and M, for example, a combination of KRb, KCs, RbCs, KRbCs (the order of each element can be changed) can be used.

Then, when a visible light transmittance is 85% when computed for light absorption by the heat ray shielding fine particles alone, an average value of transmittance in a wavelength region of 800 nm to 900 nm is 30% or more and 60% or less, and an average value of transmittance in a wavelength region of 1200 nm to 1500 nm is 20% or less, and a transmittance at a wavelength of 2100 nm is 22% or less.

Then, in the composite tungsten oxide fine particle represented by the general formula $(L_A M_B) W_C O_D$, the atomic ratio of the elements L and M and tungsten is preferably $0.001 \leq (A+B)/C \leq 1.0$, and more preferably $0.25 \leq (A+B)/C \leq 0.35$. This is because if the value of $(A+B)/C$ is 0.001 or more and 1.0 or less, and more preferably 0.25 or more and 0.35 or less, a hexagonal crystal single phase of the composite tungsten oxide can be easily obtained, and the heat ray absorption effect is sufficiently exhibited. Meanwhile, a value of D may be any value as long as the composite tungsten oxide can be hexagonal. Note that, tetragonal or orthorhombic crystals may be precipitated in the composite tungsten oxide in addition to the hexagonal crystals. The heat ray absorption effect of these precipitates other than these hexagonal crystals cannot be equal to the absorption properties of the hexagonal composite tungsten oxide. However, there is no particular problem even if these precipitates other than the hexagonal crystals are contained to such an extent that they do not affect the heat ray absorption effect exhibited by the hexagonal composite tungsten oxide alone.

It is preferable that the composite tungsten oxide does not contain other impurity. The absence of the impurity is confirmed by not observing an impurity peak when XRD measurement is performed to the composite tungsten oxide powder.

Further, some of the oxygen in the composite tungsten oxide of the present invention may be substituted with another element as long as there is no reduction in the heat ray absorption effect etc. Such other elements include, for example, nitrogen and sulfur, a halogen, or the like.

The particle size of the composite tungsten oxide fine particles of the present invention can be appropriately selected according to the purpose of use of the composite tungsten oxide fine particles, or of the heat ray shielding film/heat ray shielding substrate produced by using a dispersion liquid thereof. However, the particle size is preferably from 1 nm to 800 nm. This is because when the particle size is 800 nm or less, powerful near-infrared absorption can be exhibited by the composite tungsten oxide fine particles of the present invention, and moreover, industrial manufacture is easy when the particle size is 1 nm or more.

In cases in which a heat ray shielding layer is to be used in an application requiring transparency, preferably the composite tungsten oxide fine particles have a dispersed particle size of 40 nm or less. This is because scattering of light by the fine particles in Mie scattering and Raleigh scattering is sufficiently suppressed when the composite tungsten oxide fine particles have a dispersed particle size smaller than 40 nm, and transparency can be efficiently maintained at the same time as maintaining visibility in the visible light wavelength region. In order to further suppress scattering when used in applications having particular requirements for transparency, such as windshields of automobiles, the dispersed particle size of the composite tungsten oxide fine particles should be 30 nm or less, and preferably 25 nm or less.

[b] Method for Producing Heat Ray Shielding Fine Particles

The composite tungsten oxide fine particles of the present invention can be obtained by heat-treat a tungsten compound starting material in an inert gas atmosphere or a reducing gas atmosphere.

First, explanation follows regarding the tungsten compound starting material.

The tungsten compound starting material of the present invention is a mixture containing tungsten, element L, element M each having a simple substance or a compound thereof. The tungsten compound starting material of the present invention is a mixture containing tungsten and element M in elemental form or as compounds. As the tungsten raw material, preferably one or more raw materials is selected from a tungstic acid powder, a tungsten trioxide powder, a tungsten dioxide powder, a hydrate powder of tungsten oxide, a tungsten hexachloride powder, an ammonium tungstate powder, a hydrate powder of an oxide of tungsten obtained by dissolving tungsten hexachloride powder in alcohol and then drying, a hydrate powder of an oxide of tungsten obtained by dissolving tungsten hexachloride in alcohol and then adding water to cause precipitation then drying the precipitate, a tungsten compound powder obtained by drying an aqueous solution of ammonium tungstate, and a tungsten metal powder. Examples of the raw material for the elements L and M include element L and element M in elemental form, and a chloride salt, a nitrate salt, a sulfate salt, an oxalate salt, an acetate, an oxide, a carbonate, a tungstic acid salt, and a hydroxide of element L or element M, and the like; however there is no limitation thereto.

Each of the above-mentioned raw materials of tungsten, elements L and M was weighed, which are then mixed in predetermined amounts satisfying $0.001 \leq (A+B)/C \leq 1.0$. When doing so, the respective raw materials for the tungsten and the elements L and M are mixed as uniformly as possible, and if possible are preferably uniformly mixed at the molecular level. Thus, each of the above raw material are most preferably mixed in the form of solutions, and each of the raw materials is preferably soluble in a solvent such as water, an organic solvent, or the like.

When the raw materials are each soluble in a solvent such as water, an organic solvent, or the like, then the tungsten compound starting material of the present invention can be produced by evaporating off the solvent after sufficiently mixing each of the raw materials and the solvent. Naturally, even without a solvent in which each of the raw materials is soluble, the tungsten compound starting material of the present invention can be produced by sufficiently uniformly mixing the raw materials together using a known means such as a ball mill.

Next, explanation follows regarding the heat treatment in an inert gas atmosphere or a reducing gas atmosphere. First, a heat treatment condition in the inert gas atmosphere is preferably 400° C. or more and 1000° C. or less. The starting material heat-treated at 400° C. or more has a sufficient heat ray absorbing power and is efficient as heat ray shielding fine particles. As the inert gas, an inert gas such as Ar, $N_2$ is preferably used.

Further, as the heat treatment condition in the reducing atmosphere, it is preferable to heat-treat the starting material at 300° C. or more and 900° C. or less. When the temperature is 300° C. or more, a production reaction of the composite tungsten oxide having a hexagonal structure according to the present invention proceeds, and when it is 900° C. or less, undesirable side reaction products such as composite tungsten oxide fine particles having a structure other than hexagonal crystal and metal tungsten are hardly formed, which is preferable.

The reducing gas used here is not particularly limited, but is preferably $H_2$. When $H_2$ is used as the reducing gas, the composition of the reducing atmosphere is preferably, for example, one in which $H_2$ is mixed with an inert gas such as Ar, $N_2$ or the like at a volume ratio of 0.1% or more, more preferably mixed at 0.2% or more. When the volume ratio of the $H_2$ is 0.1% or more, reduction can progress with good efficiency. Depending on conditions such as the reducing temperature and reducing time, and a type and a concentration of the reducing gas, it is possible to produce the composite tungsten oxide fine particles represented by a general formula $(L_AM_B)W_CO_D$ and having a hexagonal crystal structure (Wherein the element L is an element selected from K, Rb, Cs, the element M is one or more elements selected from K, Rb, Cs and different from the element L). As described above, the atomic number ratio of the elements L and M and W in the structure of the composite tungsten oxide is preferably $0.001 \leq (A+B)/C \leq 1.0$, and more preferably $0.25 \leq (A+B)/C \leq 0.35$, and can be realized by appropriately adjusting the above-described processing conditions.

If necessary, after performing the reduction treatment in the reducing gas atmosphere, heat treatment may be performed in the inert gas atmosphere. In such cases, the heat treatment in the inert gas atmosphere is preferably performed at a temperature of 400° C. or more and 1200° C. or less.

Preferably from a viewpoint of improving weather resistance, the heat ray shielding fine particles of the present invention are surface treated using a compound containing one or more elements selected from Si, Ti, Zr, and Al, and are preferably coated by an oxide thereof. To perform this surface treatment, a known surface treatment method may be performed using an organic compound containing one or more elements selected from Si, Ti, Zr, and Al. For example, the heat ray shielding fine particles according to the present invention and an organosilicon compound may be mixed together, and hydrolysis treatment performed.

[c] Method for Producing a Heat Ray Shielding Fine Particle Dispersion Body

The method for producing a heat ray shielding fine particle dispersion body will be explained as follows, in sequence, under the headings of [1] A method for producing a heat ray shielding fine particle dispersion body in powdery granular form, and [2] A method for producing a sheet-shaped or film-shaped heat ray shielding fine particle dispersion body (heat ray shielding film, heat ray shielding sheet).

[1] A method for producing a heat ray shielding fine particle dispersion body in powdery granular form A heat ray shielding fine particle dispersion liquid of the present invention can be obtained by appropriately adding an appropriate amount of a dispersant, a coupling agent, a surfactant and the like to the heat ray shielding fine particles of the present invention, fatty acid and/or fatty acid amide, and a liquid medium, and performing dispersion treatment to a mixture. A method for dispersing the heat ray shielding fine particles into the liquid medium can be arbitrarily selected as long as it is a method of uniformly dispersing the fine particles in the liquid medium. As an example, a method such as a bead mill, a ball mill, a sand mill, ultrasonic dispersion or the like can be used.

The heat ray shielding fine particle dispersion liquid can be produced by selecting as medium water, an organic solvent, a petroleum solvent, oil/fat, a liquid resin, a liquid plasticizer for plastics, or a mixture thereof.

As the organic solvent satisfying these requirements, various organic solvents can be selected, such as an alcohol-based, ketone-based, hydrocarbon-based, glycol-based, or water-based organic solvent. Specific example thereof include: alcohol-based solvents such as methanol, ethanol, 1-propanol, isopropanol, butanol, pentanol, benzyl alcohol, diacetone alcohol and the like; ketone-based solvents such as acetone, methyl ethyl ketone, methyl propyl ketone, methyl isobutyl ketone, cyclohexanone, isophorone and the like; ester-based solvents such as 3-methyl-methoxy-propionate and the like; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate and the like; amides such as formamide, N-methylformamide, dimethylformamide, dimethylacetamide, N-methyl-2-pyrrolidone and the like; aromatic hydrocarbons such as toluene, xylene and the like; and halogenated hydrocarbons such as ethylene chloride, chlorobenzene, and the like. An organic solvent having a low polarity is preferable from out of the above, and, in particular, isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate, and the like are more preferable. These solvents may be used alone or in a combination of two or more thereof.

As the petroleum solvent, Isopar E, Exol Hexane, Exol Heptane, Exol E, Exol D30, Exol D40, Exol D60, Exol D80, Exol D95, Exol D110, Exol D130 (manufactured by Exxon Mobil Corporation) and the like are preferable.

Methyl methacrylate or the like is preferable as the liquid resin. Preferable examples of the liquid plasticizer for plastics include a plasticizer that is a compound of a monohydric alcohol and an organic acid ester, an ester-based plasticizer such as polyhydric alcohol organic acid ester compound, and a phosphoric acid-based plasticizer such as an organic phosphate-based plasticizer, and the like. From among the above, triethylene glycol di-2-ethyl hexanoate, triethylene glycol di-2-ethyl butyrate, tetraethylene glycol di-2-ethyl hexanoate are more preferable due to having a low propensity to hydrolysis.

A dispersant, a coupling agent, and a surfactant may be selected according to the application, however preferably a group containing an amine, a hydroxyl group, a carboxyl group, or an epoxy group is included as a functional group thereof. These functional groups are adsorbed onto the surface of the composite tungsten oxide fine particles, prevent aggregation of the composite tungsten oxide fine particles, and have the effect of uniformly dispersing the heat ray shielding fine particles according to the present invention even in a heat ray shielding layer.

Preferably used examples of dispersants include phosphate ester compounds, polymeric dispersants, silane-based coupling agents, titanate-based coupling agents, aluminum-based coupling agents, and the like, however the present invention is not limited thereto. As the polymeric dispersants, acrylic polymer dispersant, urethane polymer dispersant, acrylic block copolymer type polymer dispersant, polyether dispersant, polyester polymer dispersant, etc., can be used.

An addition amount of the dispersant is preferably in a range from 10 parts by weight to 1000 parts by weight based on 100 parts by weight of the heat ray shielding fine particles, and more preferably in a range from 20 parts by weight to 200 parts by weight with respect thereto. When the addition amount of the dispersant is in the above range, dispersion stability is maintained such that aggregation of the heat ray shielding fine particles in the liquid does not occur.

The dispersion treatment method may be freely selected from known methods that are methods to uniformly disperse the heat ray shielding fine particles in a liquid medium and, for example, a bead mill, a ball mill, a sand mill, ultrasonic dispersion, or the like may be used for the dispersion treatment method.

Various additives and dispersants may be added and the pH may be adjusted in order to obtain a homogeneous heat ray shielding fine particle dispersion liquid.

The content of the heat ray shielding fine particles in the heat ray shielding fine particle dispersion liquid described above is preferably 0.01 mass % to 50 mass %. When the content is 0.01 mass % or more, it can be suitably used for production of a plastic molded body described later and the like, and when the content is 50 mass % or less, industrial production is easy. The content is more preferably 1 mass % or more and 35 mass % or less.

Dispersed powder and plasticizer dispersion liquid according to the present invention can be obtained by removing a volatile component from the heat ray shielding fine particle dispersion liquid. As a method for removing the volatile component from the heat ray shielding fine particle dispersion liquid, it is preferable to dry the heat ray shielding fine particle dispersion liquid under reduced pressure. Specifically, reduced pressure drying is performed while stirring the heat ray shielding fine particle dispersion liquid so as to separate the heat ray shielding fine particle-containing composition and the volatile component. A vacuum mixer dryer may be used as the device used for such reduced pressure drying. However, any device having such functionality may be used, and there are no particularly limitations thereto. The value of pressure during a reduced pressure drying step may be selected as appropriate.

Using such a reduced pressure drying method not only improves the efficiency of removing the volatile component from the heat ray shielding fine particle dispersion liquid, but also means that the dispersed powder and the plasticizer dispersion liquid according to the present invention are not exposed to a high temperature for a long time. This is preferable so as not to cause aggregation of the heat ray shielding fine particles dispersed in the dispersed powder or in the plasticizer dispersion liquid. Further, productivity is raised for the dispersed powder and the plasticizer dispersion liquid, and it is easy to recover the evaporated volatile component, which is also preferable from environmental considerations.

Residual volatile component in the dispersed powder and the plasticizer dispersion liquid according to the present invention obtained after the drying step is preferably 5 mass % or less. This is because when the residual volatile component is 5 mass % or less, bubbles are not generated when the dispersed powder and the plasticizer dispersion liquid are processed into a heat ray shielding laminated transparent substrate, and good appearance and optical properties are maintained.

Further, a master batch of the present invention can be obtained by uniformly mixing the heat ray shielding fine particles, the dispersed powder, and the granules or pellets of a thermoplastic resin, and, if necessary, other additives, then kneading the mixture using a vent type single-screw or twin-screw extruder, and processing the mixture into pellets by a normal method in which strands that have been meltextruded are then cut. Examples of shapes that may be used in such cases include a cylindrical shape or a polygonal pillar shape. Further, a so-called hot cut method may also be used in which a molten extrudate is cut directly. In such cases an approximately spherical shape is normally achieved.

As a transparent thermoplastic resin, a preferable resin selection can be performed from the resin selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene-vinyl acetate copolymer, or a mixture of two or more resins selected from the resin group, or copolymers of two or more resins selected from the resin group.

(2) Method for Producing a Sheet-Shaped or Film-Shaped Heat Ray Shielding Fine Particle Dispersion Body A sheet-shaped or film-shaped heat ray shielding fine particle dispersion body of the present invention can be produced by uniformly mixing the dispersed powder, the plasticizer dispersion liquid, or the masterbatch of the present invention into the transparent resin. It is possible to produce the heat ray shielding sheet and the heat ray shielding film of the present invention that secures the heat ray shielding property of the composite tungsten oxide fine particles of a conventional technique and has excellent moist heat resistance, from the sheet-shaped or film-shaped heat ray shielding fine particle dispersion body.

When producing the heat ray shielding sheet or the heat ray shielding film according to the present invention, various thermoplastic resins can be used as the resin to configure such a sheet or film. Taking into consideration that the heat ray shielding sheet and the heat ray shielding film of the present invention will be applied to various types of window material, the thermoplastic resin preferably has sufficient transparency.

Specifically, a preferable resin can be selected from: a resin selected from a resin group consisting of a polyethylene terephthalate resin, a polycarbonate resin, an acrylic resin, a styrene resin, a polyamide resin, a polyethylene resin, a vinyl chloride resin, an olefin resin, an epoxy resin, a polyimide resin, a fluororesin, and an ethylene-vinyl acetate copolymer, a mixture of two or more resins selected from the above resin group, or a copolymer of two or more resins selected from the above resin group.

Moreover, when the heat ray shielding sheet of the present invention is used as-is as a board shaped window material, in consideration of the viewpoints of high transparency and general characteristics demanded of a window material, namely rigidity, light weight, long-term durability, cost, and the like, preferably a polyethylene terephthalate resin, a polycarbonate resin, or an acrylic resin is used therefor, and more preferably a polycarbonate resin is used therefor.

Meanwhile, when the heat ray shielding sheet and the heat ray shielding film of the present invention are used as an intermediate layer in a heat ray shielding laminated glass, described later, when considered from the perspectives of adhesion properties to the transparent substrate, weather resistance, penetration resistance, and the like, a polyvinyl acetal resin, and an ethylene-vinyl acetate copolymer are preferably used therefor, and a polyvinyl butyral resin is more preferably used therefor.

Moreover, in cases in which the heat ray shielding sheet or the heat ray shielding film is used as an intermediate layer, a plasticizer is preferably further added when the thermoplastic resin configuring the sheet or film does not in itself have sufficient softness and adhesion properties to the transparent substrate, such as, for example, when the thermoplastic resin is a polyvinyl acetal resin.

The substances used as the plasticizers for the thermoplastic resin of the present invention may be used as such a plasticizer. For example, plasticizers that may be used for a heat ray shielding film configured from a polyvinyl acetal resin include ester-based plasticizers such as a plasticizer that is a compound of a monohydric alcohol and an organic acid ester, polyhydric alcohol organic acid ester compound, and the like, and a phosphoric acid-based plasticizer such as an organic phosphate-based plasticizer, and the like. All these plasticizers are preferably liquid at room temperature. From among them, a plasticizer that is an ester compound synthesized from a polyhydric alcohol and a fatty acid is preferable.

The heat ray shielding sheet can be produced by kneading the dispersed powder or plasticizer dispersion liquid or master batch with the thermoplastic resin and, optionally, a plasticizer or another additive, then using a known method, such as an extrusion molding method, injection molding method, or the like to mold the kneaded mixture into, for example, a sheet member having a flat surface profile or a curved surface profile.

A known method may be used as the method for forming the heat ray shielding sheet and the heat ray shielding film. For example, a calendar roll method, an extrusion method, a casting method, an inflation method, or the like can be used.

[d] Heat Ray Shielding Laminated Transparent Substrate Producing Method

Explanation follows regarding a heat ray shielding laminated transparent substrate formed by interposing the heat ray shielding sheet and the heat ray shielding film of the present invention as an intermediate layer between plural sheets of transparent substrate made from a glass sheet or a plastic material.

The heat ray shielding laminated transparent substrate is laminated by using a transparent substrate to sandwich an intermediate layer from both sides. Examples of the transparent substrate include glass sheets, or sheet shaped plastic or film shaped plastic transparent in the visible light region. The plastic material is not particularly limited, and the plastic material is selectable according to the application. For example, when used in a transport vehicle such as an automobile, from the perspectives of securing visibility for the driver and passengers of the transport vehicle, a transparent resin is preferable, such as a polycarbonate resin, an acrylic resin, and a polyethylene terephthalate resin, and a PET resin, polyamide resin, a vinyl chloride resin, olefin resin, an epoxy resin, a polyimide resin, a fluoresin, and the like may also be used therefor.

The heat ray shielding laminated transparent substrate of the present invention may also be obtained by disposing plural inorganic glass sheets facing each other with the heat ray shielding sheet and heat ray shielding film of the present invention interposed therebetween, and then using a known method to laminate these together so as to form an integrated body. The heat ray shielding laminated inorganic glass obtained thereby is mainly used as an inorganic glass in the front of an automobile and as windows in buildings.

There are no particular limitations to the concentration of the heat ray shielding fine particles contained in the heat ray shielding sheet, the heat ray shielding film, and the heat ray shielding laminated transparent substrate of the present invention. However, the content per projected surface area of the sheet/film is preferably from 0.1 $g/m^2$ to 5.0 $g/m^2$. This is because when the content is 0.1 $g/m^2$ or more, significantly enhanced heat ray shielding properties can be exhibited compared to cases in which no heat ray shielding fine particles are contained, and the visible light transparency of the heat ray shielding sheet/film is not completely lost when the content is 5.0 g/m² or less.

The optical properties of the heat ray shielding fine particle dispersion body and the heat ray shielding laminated transparent substrate of the present invention are as follows. When the visible light transmittance is 70%, the average value of the transmittance in the wavelength range of 800 to 900 nm is 13% or more and 45% or less, and the average value of the transmittance existing in the wavelength range of 1200 to 1500 nm is 8% or less, and the transmittance at the wavelength of 2100 nm is 5% or less. Note that adjusting the visible light transmittance to 70% is easily achieved by adjusting the concentration of the heat ray shielding particles in the thermoplastic resin or by adjusting the thickness of the thermoplastic resin.

Further, in order to further give the ultraviolet shielding function to the heat ray shielding fine particle dispersion body and the heat ray shielding laminated transparent substrate of the present invention, at least one or more of the particles of inorganic titanium oxide, zinc oxide, cerium oxide or the like, organic type benzophenone, benzotriazole, or the like may be added.

Further, in order to improve the visible light transmittance of the heat ray shielding fine particle dispersion body and the heat ray shielding laminated transparent substrate of the present invention, particles such as ATO, ITO, aluminum-added zinc oxide, indium tin composite oxide, etc. may be further mixed into the thermoplastic resin. By adding these transparent particles to the coating layer, the transmittance near the wavelength of 750 nm is increased, and in addition, due to shielding the infrared light of a wavelength longer than 1200 nm, the heat ray shielding fine particle dispersion body and the heat ray shielding laminated transparent substrate having high transmittance of near infrared light and high heat ray shielding property can be obtained.

EXAMPLES

Specific explanation of the present invention follows, with reference to examples.

However, the present invention is not limited to the following examples.

The transmittance for light in the wavelength region from 300 nm to 2100 nm was measured for the heat ray shielding fine particle dispersion liquids of Examples and Comparative Examples using the spectrophotometer U-4100, produced by Hitachi, Ltd, while the dispersion liquids were held in a spectrophotometer cell (model number: S10-SQ-1, material: synthetic quartz, optical path length: 1 mm, produced by GL Sciences, Inc.).

When performing these measurements, transmittance was measured in a state in which the cell was filled with the solvent of the dispersion liquid (methyl isobutylketone) to find a baseline transmittance measurement. As a result, the influence of light reflection at the spectrophotometer cell surfaces and of light absorption by the solvent is excluded from the spectral transmittance and visible light transmittance, as explained below, and only light absorption by the heat ray shielding fine particles was calculated.

The visible light transmittance was calculated from the transmittance for light having a wavelength of 380 to 780 nm, based on JIS R 3106. The average dispersed particle size of the heat ray shielding fine particles was measured using a Microtrac particle size distribution meter manufactured by Nikkiso Co., Ltd.

The optical properties of the heat ray shielding sheet and the laminated transparent substrate in Examples and Comparative Examples were measured using a spectrophotometer U-4000 (manufactured by Hitachi, Ltd.). The visible light transmittance was measured according to JIS R 3106 from the transmittance for the light of a wavelength of 380 to 780 nm.

Example 1

(Heat Ray Shielding Sheet Using Composite Tungsten Oxide Fine Particles Having Rb/Cs/W (Molar Ratio)=0.30/0.03/1.00)

Each powder of tungstic acid ($H_2WO_4$), cesium hydroxide (CsOH), rubidium hydroxide (RbOH) was weighed at a ratio equivalent to Rb/Cs/W (molar ratio)=0.30/0.03/1.00, and thereafter thoroughly mixed in an agate mortar to obtain a mixed powder. The mixed powder was heated under supply of 5% $H_2$ gas using $N_2$ gas as a carrier and subjected to reduction treatment at 600° C. for 1 hour, and thereafter baked at 800° C. for 30 minutes in an $N_2$ gas atmosphere to obtain composite tungsten oxide fine particles (hereinafter abbreviated as "powder A") which are heat ray shielding fine particles of Example 1.

The results of measurement of powder A by X-ray diffraction method are shown in FIG. 1. From the obtained X-ray diffraction profile, it was found that the powder A was a hexagonal single phase. Accordingly, it was judged that Rb component, Cs component and tungsten component were completely dissolved in the crystals of the hexagonal composite tungsten oxide fine particles.

20 mass % of the powder A, 10 mass % of an acrylic based polymeric dispersant having a group containing an amine as a functional group (acrylic based dispersant having an amine number of 48 mg KOH/g, and decomposition temperature of 250° C. (hereinafter abbreviated as "dispersant a"), and 70 mass % of methyl isobutyl ketone were weighed. These were loaded into a paint shaker containing 0.3 mm φ $ZrO_2$ beads, and pulverized/dispersed for 15 hours to obtain a heat ray shielding fine particle dispersion liquid (hereinafter abbreviated as "dispersion liquid A"). The average dispersed particle size of the heat ray shielding fine particles in the dispersion liquid A was measured and found to be 26 nm.

The dispersion liquid A was appropriately diluted with MIBK, placed in a 10 mm thick rectangular receptacle, and the spectral transmittance measured. The transmittance profile of the dispersion liquid A measured when the dilution ratio had been adjusted to give a visible light transmittance of 85% gave an average value of transmittance for wavelengths from 800 nm to 900 nm of 37.1%, an average value of transmittance for wavelengths from 1200 nm to 1500 nm of 8.2%, and a transmittance at a wavelength of 2100 nm of 15.2%. This confirmed that clearly the visible light transmission band was widened and the heat ray shielding performance improved at the wavelength of 2100 nm, in comparison to cesium tungsten bronze produced by a conventional method illustrated in Comparative Example 1 below. The measurement results of the dispersion liquid A are shown in Table 1.

Dispersant a was further added to the dispersion liquid A so that the mass ratio of the dispersant a and the composite tungsten oxide fine particles was [dispersant a/composite tungsten oxide fine particle]=3. Next, methyl isobutyl ketone was removed from the composite tungsten oxide fine particle dispersion liquid A using a spray drier to obtain a composite tungsten oxide fine particle dispersed powder (hereinafter abbreviated as dispersed powder A).

Dispersed powder A was added to a polycarbonate resin, which was a thermoplastic resin, at a predetermined amount so that the visible light transmittance of the produced heat ray shielding sheet (2.0 mm thickness) was 70%, thereby preparing a composition for producing the heat ray shielding sheet.

The composition for producing the heat ray shielding sheet was kneaded at 280° C. using a twin screw extruder, extruded from a T die, and formed into a sheet material having a thickness of 2.0 mm by a calendar roll method, thereby obtaining a heat ray shielding sheet (hereinafter, abbreviated as sheet A) of Example 1.

The above-described visible light transmittance of sheet A was 70%.

When the optical properties of sheet A were measured, it was found, from the transmission profile, that the average value of the transmittance at a wavelength of 800 to 900 nm was 19.6%, the average value of the transmittance at a wavelength of 1200 to 1500 nm was 1.8%, the transmittance at a wavelength of 2100 nm was 2.5%, and the haze was 1.0%. The evaluation results of sheet A are shown in Table 2.

Example 2

(Heat Ray Shielding Sheet Using Composite Tungsten Oxide Fine Particles Having Rb/K/W (Molar Ratio)=0.10/0.23/1.00)

Composite tungsten oxide fine particles (hereinafter abbreviated as "powder B") which are heat ray shielding fine particles of Example 2, were obtained in the same manner as in example 1 except that each powder of tungstic acid ($H_2WO_4$), rubidium hydroxide (RbOH) and potassium hydroxide (KOH) was weighed at a ratio equivalent to Rb/K/W (molar ratio)=0.10/0.23/1.00.

Figure 2:
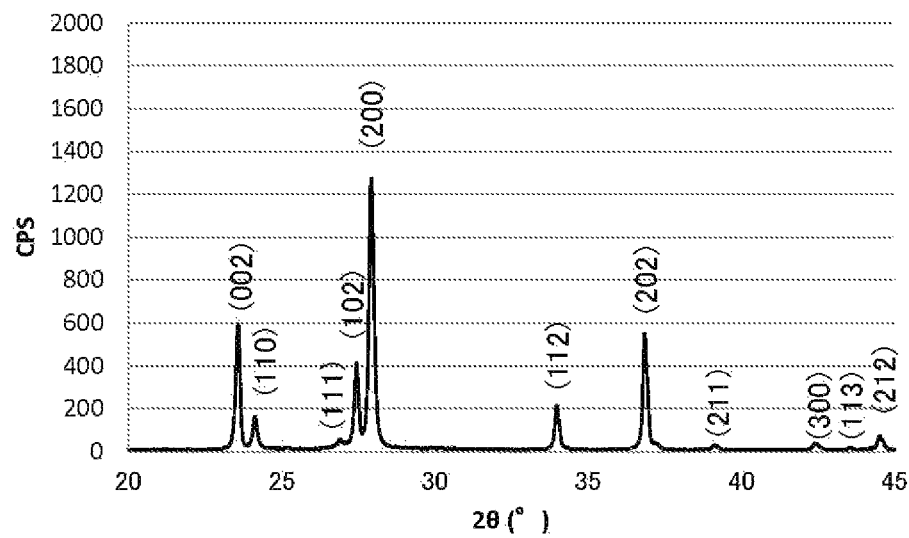
FIG. 2 is an X-ray diffraction profile of powder B according to example 2.

Powder B was measured by an X-ray diffraction method and the result is shown in FIG. 2. From the obtained X-ray diffraction profile, it was found that powder B was a pure hexagonal single phase. Accordingly, it was judged that Rb component, K component and tungsten component were completely dissolved in the crystals of the hexagonal composite tungsten oxide fine particles.

20 mass % of the powder B, 10 mass % of a dispersant, and 70 mass % of MIBK were weighed. These were loaded into a paint shaker containing 0.3 mm φ $ZrO_2$ beads, and pulverized/dispersed for 12 hours to obtain a heat ray shielding fine particle dispersion liquid (hereinafter abbreviated as "dispersion liquid B"). The average dispersed particle size of the heat ray shielding fine particles in dispersion liquid B was measured and found to be 21 nm.

Dispersion liquid B was appropriately diluted with MIBK and placed in a rectangular container having a thickness of 10 mm, and the spectral transmittance was measured. From the transmittance profile of dispersion liquid B when measured by adjusting a dilution ratio so that the visible light transmittance was 85%, it was found that the average value of the transmittance at a wavelength of 800 to 900 nm was 58.3%, the average value of the transmittance at a wavelength of 1200 to 1500 nm was 19.4%, and the transmittance at a wavelength of 2100 nm was 16.2%.

The measurement results of dispersion liquid B are shown in Table 1.

Composite tungsten oxide fine particle dispersed powder (hereinafter abbreviated as dispersed powder B) was obtained in the same manner as in Example 1 except that dispersant a was further added to dispersion liquid B.

A heat ray shielding sheet (hereinafter abbreviated as "sheet B") of Example 2 was obtained in the same manner as in Example 1 except that the dispersed powder B was used.

The above-described visible light transmittance of sheet B was 70%.

When the optical properties of sheet B was measured, it was found, from the transmission profile, that the average value of the transmittance at a wavelength of 800 to 900 nm was 39.2%, the average value of the transmittance at a wavelength of 1200 to 1500 nm was 7.0%, the transmittance at a wavelength of 2100 nm was 2.7%, and the haze was 1.2%. The evaluation results of sheet B are shown in Table 2.

Example 3

(Heat Ray Shielding Sheet Using Composite Tungsten Oxide Fine Particles Having Rb/K/W (Molar Ratio)=0.20/0.13/1.00)

Composite tungsten oxide fine particles (hereinafter abbreviated as "powder C") which were heat ray-shielding fine particles of Example 3, were obtained in the same manner as in Example 1 except that each powder of tungstic acid ($H_2WO_4$), rubidium hydroxide (RbOH), potassium hydroxide (KOH) was weighed at a ratio equivalent to Rb/K/W (molar ratio)=0.20/0.13/1.00.

Figure 3:
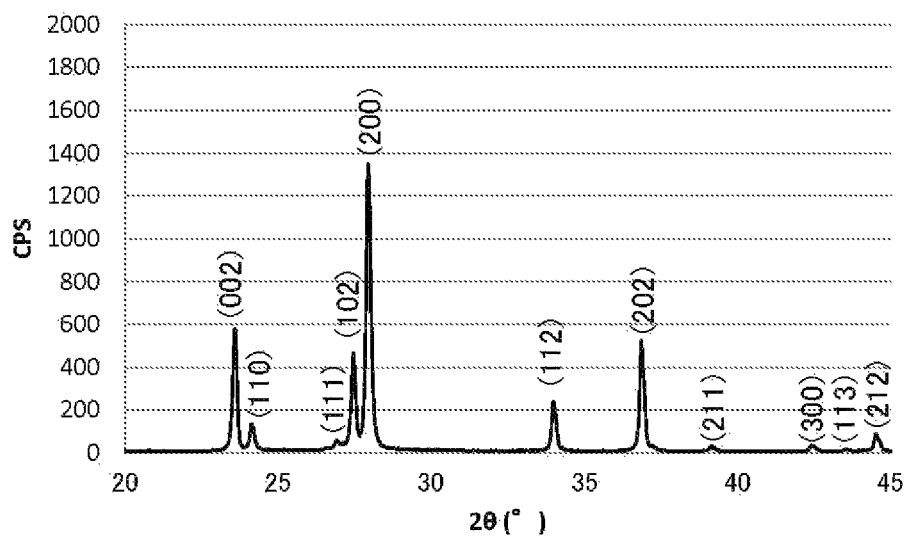
FIG. 3 is an X-ray diffraction profile of powder C according to example 3.

The measurement results of powder C by X-ray diffraction method are shown in FIG. 3. From the obtained X-ray diffraction profile, powder C was found to be a hexagonal single phase. Accordingly, it was judged that Rb component, K component and tungsten component were completely dissolved in the crystals of the hexagonal composite tungsten oxide fine particles.

20 mass % of powder C, 10 mass % of dispersant a, and 70 mass % MIBK were weighed. These were loaded into a paint shaker containing 0.3 mm φ $ZrO_2$ beads, and pulverized/dispersed for 12 hours to obtain a heat ray shielding fine particle dispersion liquid (hereinafter abbreviated as "dispersion liquid C"). The average dispersed particle size of the heat ray shielding fine particles in the dispersion liquid A was measured and found to be 18 nm.

Dispersion liquid C was appropriately diluted with MIBK and placed in a rectangular container having a thickness of 10 mm, and the spectral transmittance was measured. From the transmittance profile of dispersion liquid C when measured by adjusting a dilution ratio so that the visible light transmittance was 85%, it was found that the average value of the transmittance at a wavelength of 800 to 900 nm was 53.3%, the average value of the transmittance at a wavelength of 1200 to 1500 nm was 13.2%, and the transmittance at a wavelength of 2100 nm was 11.5%.

The measurement results of dispersion liquid C are shown in Table 1.

Dispersant a was further added to dispersion liquid C so that the mass ratio of dispersant a and the composite tungsten oxide fine particles was [dispersant a/composite tungsten oxide fine particles]=3. Next, using a stirring type vacuum dryer (Universal Mixer produced by Tsukishima), heated distillation was performed under reduced pressure at 80° C. for 2 hours and methyl isobutyl ketone was removed, to obtain the composite tungsten oxide fine particle dispersed powder (hereinafter abbreviated as dispersed powder C).

A heat ray shielding sheet (hereinafter abbreviated as sheet C) of Example 3 was obtained in the same manner as in Example 1 except that dispersed powder C was used.

The above-described visible light transmittance of sheet C was 70%.

When the optical properties of sheet C was measured, it was found, from the transmission profile, that the average value of the transmittance at a wavelength of 800 to 900 nm was 34.2%, the average value of the transmittance at a wavelength of 1200 to 1500 nm was 3.9%, the transmittance at a wavelength of 2100 nm was 1.6%, and the haze was 1.1%. The evaluation results of sheet C are shown in Table 2.

Example 4

(Heat Ray Shielding Sheet Using Composite Tungsten Oxide Fine Particles Having Cs/K/W (Molar Ratio)=0.05/0.28/1.00)

Composite tungsten oxide fine particles (hereinafter abbreviated as "powder D") which were heat ray shielding fine particles of Example 4 were obtained in the same manner as in Example 1 except that each powder of tungstic acid ($H_2WO_4$), cesium hydroxide (CsOH) and potassium hydroxide (KOH) was weighed at a ratio equivalent to Cs/K/W (molar ratio)=0.05/0.28/1.00.

Figure 4:
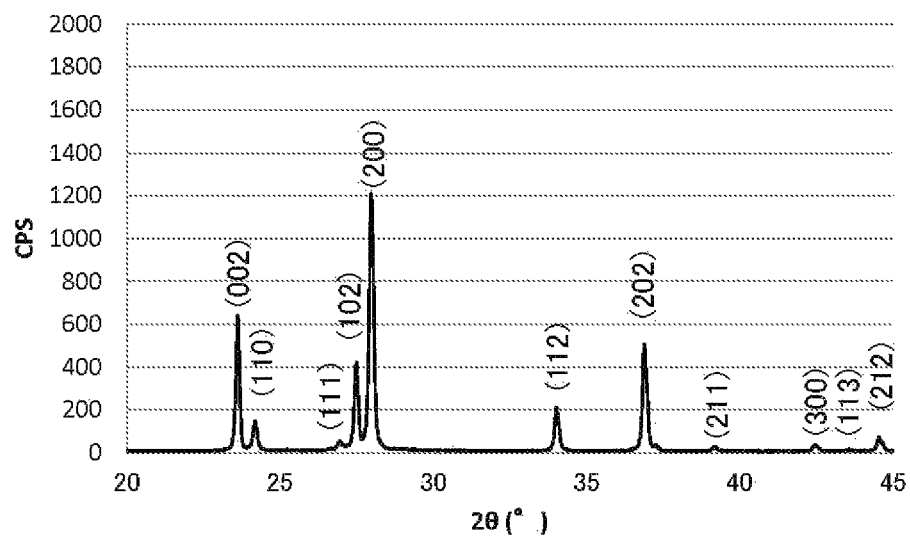
FIG. 4 is an X-ray diffraction profile of the powder D according to example 4.

The measurement results of powder D by X-ray diffraction method are shown in FIG. 4. From the obtained X-ray diffraction profile, powder D was found to be a hexagonal single phase. Accordingly, it was judged that Cs component, K component and tungsten component were completely dissolved in the crystals of the hexagonal composite tungsten oxide fine particles.

20 mass % of powder D, 10 mass % of dispersant a, and 70 mass % MIBK were weighed. These were loaded into a paint shaker containing 0.3 mm φ $ZrO_2$ beads, and pulverized/dispersed for 12 hours to obtain a heat ray shielding fine particle dispersion liquid (hereinafter abbreviated as "dispersion liquid D"). The average dispersed particle size of the heat ray shielding fine particles in the dispersion liquid D was measured and found to be 23 nm.

Dispersion liquid D was appropriately diluted with MIBK and placed in a rectangular container having a thickness of 10 mm, and the spectral transmittance was measured. From the transmittance profile of dispersion liquid D when measured by adjusting a dilution ratio so that the visible light transmittance was 85%, it was found that the average value of the transmittance at a wavelength of 800 to 900 nm was 57.7%, the average value of the transmittance at a wavelength of 1200 to 1500 nm was 15.7%, and the transmittance at a wavelength of 2100 nm was 13.3%.

The measurement results of dispersion liquid D are shown in Table 1.

Composite tungsten oxide fine particle dispersed powder (hereinafter abbreviated as dispersed powder D) was obtained in the same manner as in Example 1 except that dispersant a was further added to dispersion liquid D.

A heat ray shielding sheet (hereinafter abbreviated as sheet D) of Example 4 was obtained in the same manner as in Example 4 except that dispersed powder D was used.

The above-described visible light transmittance of sheet D was 70%.

When the optical properties of sheet D were measured, it was found, from the transmission profile, that the average value of the transmittance at a wavelength of 800 to 900 nm was 38.6%, the average value of the transmittance at a wavelength of 1200 to 1500 nm was 5.0%, the transmittance at a wavelength of 2100 nm was 2.0%, and the haze was 1.0%. The evaluation results of sheet D are shown in Table 2.

Example 5

(Heat Shielding Sheet Using Composite Tungsten Oxide Fine Particles Having Cs/K/W (Molar Ratio)=0.10/0.23/1.00)

Composite tungsten oxide fine particles (hereinafter abbreviated as "powder E") which were heat ray shielding fine particles of Example 5, were obtained in the same manner as in Example 1 except that each powder of Tungstic acid ($H_2WO_4$), cesium hydroxide (CsOH) and potassium hydroxide (KOH) was weighed at a ratio equivalent to Cs/K/W (molar ratio)=0.10/0.23/1.00.

Figure 5:
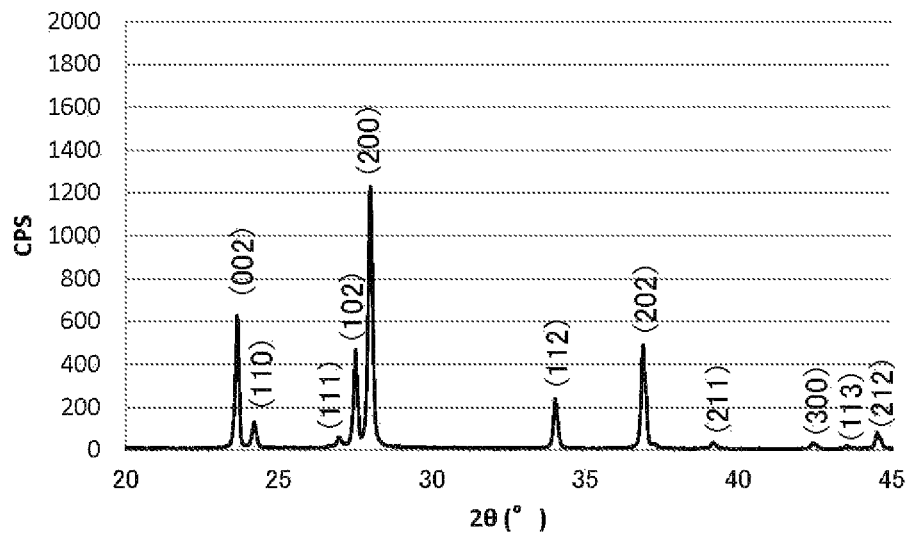
FIG. 5 is an X-ray diffraction profile of powder E according to example 5.

The measurement results of powder E by X-ray diffraction method are shown in FIG. 5. From the obtained X-ray diffraction profile, powder E was found to be a hexagonal single phase. Accordingly, it was judged that Cs component, K component and tungsten component were completely dissolved in the crystals of the hexagonal composite tungsten oxide fine particles.

20 mass % of powder C, 10 mass % of dispersant a, and 70 mass % MIBK were weighed. These were loaded into a paint shaker containing 0.3 mm φ $ZrO_2$ beads, and pulverized/dispersed for 12 hours to obtain a heat ray shielding fine particle dispersion liquid (hereinafter abbreviated as "dispersion liquid E"). The average dispersed particle size of the heat ray shielding fine particles in the dispersion liquid E was measured and found to be 24 nm.

Dispersion liquid E was appropriately diluted with MIBK and placed in a rectangular container having a thickness of 10 mm, and the spectral transmittance was measured. From the transmittance profile of dispersion liquid E when measured by adjusting a dilution ratio so that the visible light transmittance was 85%, it was found that the average value of the transmittance at a wavelength of 800 to 900 nm was 50.7%, the average value of the transmittance at a wavelength of 1200 to 1500 nm was 10.9%, and the transmittance at a wavelength of 2100 nm was 10.7%.

The measurement results of dispersion liquid E are shown in Table 1.

Composite tungsten oxide fine particle dispersed powder (hereinafter abbreviated as dispersed powder E) was obtained in the same manner as in Example 1 except that dispersant a was further added to dispersion liquid E.

The heat ray shielding sheet (hereinafter abbreviated as "sheet E") of Example 5 was obtained in the same manner as in Example 1 except that dispersed powder E was used.

The above-described visible light transmittance of sheet E was 70%.

When the optical properties of sheet E was measured, it was found, from the transmission profile, that the average value of the transmittance at a wavelength of 800 to 900 nm was 31.7%, the average value of the transmittance at a wavelength of 1200 to 1500 nm was 2.9%, the transmittance at a wavelength of 2100 nm was 1.4%, and the haze was 1.0%. The evaluation results of sheet E are shown in Table 2.

Example 6

(Heat Ray Shielding Sheet Using Composite Tungsten Oxide Fine Particles Having Cs/K/W (Molar Ratio)=0.20/0.13/1.00)

Composite tungsten oxide fine particles (hereinafter abbreviated as "powder F") which were heat ray shielding fine particles of Example 6, were obtained in the same manner as in Example 1 except that each powder of tungstic acid ($H_2WO_4$), cesium hydroxide (CsOH) and potassium hydroxide (KOH) was weighed at a ratio equivalent to Cs/K/W (molar ratio)=0.20/0.13/1.00.

Figure 6:
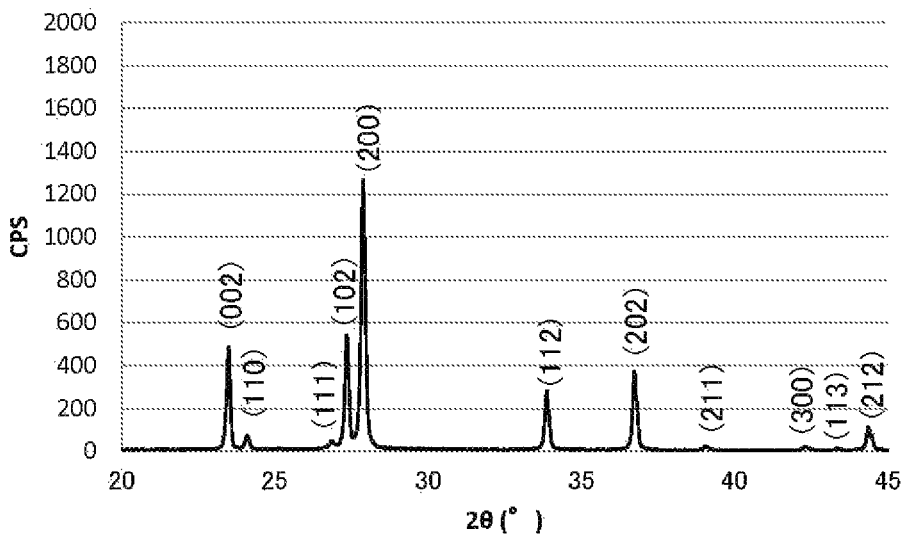
FIG. 6 is an X-ray diffraction profile of powder F according to example 6.

The measurement results of powder F by X-ray diffraction method are shown in FIG. 6. From the obtained X-ray diffraction profile, powder F was found to be a hexagonal single phase. Accordingly, it was judged that Cs component, K component and tungsten component were completely dissolved in the crystals of the hexagonal composite tungsten oxide fine particles.

20 mass % of powder F, 10 mass % of dispersant a, and 70 mass % MIBK were weighed. These were loaded into a paint shaker containing 0.3 mm φ $ZrO_2$ beads, and pulverized/dispersed for 12 hours to obtain a heat ray shielding fine particle dispersion liquid (hereinafter abbreviated as "dispersion liquid F"). The average dispersed particle size of the heat ray shielding fine particles in the dispersion liquid F was measured and found to be 28 nm.

Dispersion liquid F was appropriately diluted with MIBK and placed in a rectangular container having a thickness of 10 mm, and the spectral transmittance was measured. From the transmittance profile of dispersion liquid F when measured by adjusting a dilution ratio so that the visible light transmittance was 85%, it was found that the average value of the transmittance at a wavelength of 800 to 900 nm was 42.5%, the average value of the transmittance at a wavelength of 1200 to 1500 nm was 8.0%, and the transmittance at a wavelength of 2100 nm was 10.7%.

The measurement results of dispersion liquid F are shown in Table 1.

Composite tungsten oxide fine particle dispersed powder (hereinafter abbreviated as dispersed powder F) was obtained in the same manner as in Example 1 except that dispersant a was further added to dispersed powder F.

The heat ray shielding sheet (hereinafter abbreviated as sheet F) of Example 6 was obtained in the same manner as in Example 1 except that dispersed powder F was used.

The above-described visible light transmittance of sheet F was 70%.

When the optical properties of sheet F were measured, it was found, from the transmission profile, that the average value of the transmittance at a wavelength of 800 to 900 nm was 24.2%, the average value of the transmittance at a wavelength of 1200 to 1500 nm was 1.8%, the transmittance at a wavelength of 2100 nm was 1.4%, and the haze was 1.1%. The evaluation results of sheet F are shown in Table 2.

Example 7

(Heat Ray Shielding Sheet Using Composite Tungsten Oxide Fine Particles Having Cs/K/W (Molar Ratio)=0.25/0.08/1.00)

Composite tungsten oxide fine particles (hereinafter abbreviated as "powder G") which were heat ray shielding fine particles of Example 7, were obtained in the same manner as in Example 1 except that each powder of tungstic acid ($H_2WO_4$), cesium hydroxide (CsOH) and potassium hydroxide (KOH) was weighed at a ratio equivalent to Cs/K/W (molar ratio)=0.25/0.08/1.00.

Figure 7:
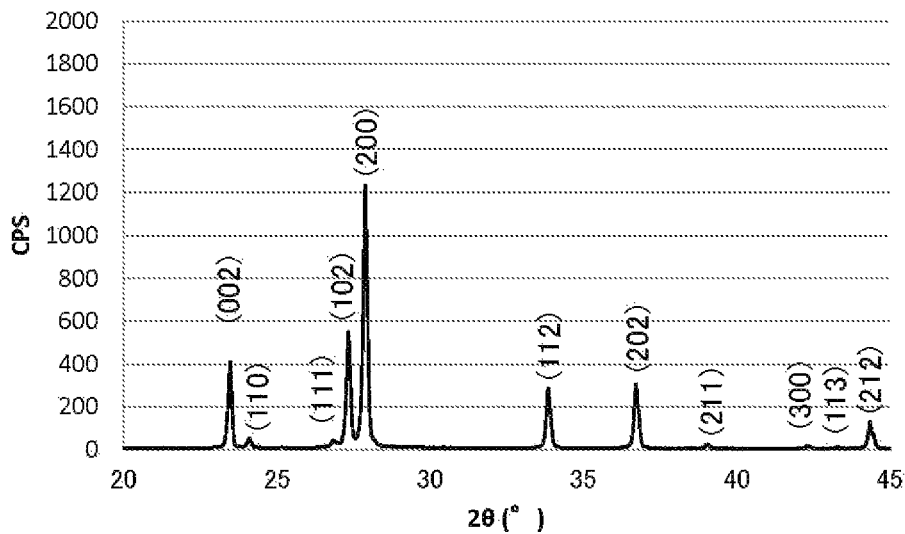
FIG. 7 is an X-ray diffraction profile of powder G according to example 7.

The measurement results of the powder G by X-ray diffraction method are shown in FIG. 7. From the obtained X-ray diffraction profile, the powder G was found to be a hexagonal single phase. Accordingly, it was judged that Cs component, K component and tungsten component were completely dissolved in the crystals of the hexagonal composite tungsten oxide fine particles.

20 mass % of powder G, 10 mass % of dispersant a, and 70 mass % MIBK were weighed. These were loaded into a paint shaker containing 0.3 mm φ $ZrO_2$ beads, and pulverized/dispersed for 12 hours to obtain a heat ray shielding fine particle dispersion liquid (hereinafter abbreviated as "dispersion liquid G"). The average dispersed particle size of the heat ray shielding fine particles in the dispersion liquid G was measured and found to be 20 nm.

Dispersion liquid G was appropriately diluted with MIBK and placed in a rectangular container having a thickness of 10 mm, and the spectral transmittance was measured. From the transmittance profile of dispersion liquid G when measured by adjusting a dilution ratio so that the visible light transmittance was 85%, it was found that the average value of the transmittance at a wavelength of 800 to 900 nm was 34.6%, the average value of the transmittance at a wavelength of 1200 to 1500 nm was 7.0%, and the transmittance at a wavelength of 2100 nm was 14.1%.

The measurement results of dispersion liquid G are shown in Table 1.

Composite tungsten oxide fine particle dispersed powder (hereinafter abbreviated as dispersed powder G) was obtained in the same manner as in Example 1 except that dispersant a was further added to dispersion liquid G.

The heat ray shielding sheet (hereinafter abbreviated as sheet G) of Example 7 was obtained in the same manner as in Example 1 except that dispersed powder G was used.

The above-described visible light transmittance of sheet G was 70%.

When the optical properties of sheet G were measured, it was found, from the transmission profile, that the average value of the transmittance at a wavelength of 800 to 900 nm was 17.6%, the average value of the transmittance at a wavelength of 1200 to 1500 nm was 1.5%, the transmittance at a wavelength of 2100 nm was 2.2%, and the haze was 1.2%. The evaluation results of sheet G are shown in Table 2.

Comparative Example 1

(Heat Ray Shielding Sheet Using Composite Tungsten Oxide Fine Particles Having Cs/W (Molar Ratio)=0.33/1.00)

Composite tungsten oxide fine particles (hereinafter abbreviated as "powder H") which were heat ray-shielding fine particles of Comparative Example 1, were obtained in the same manner as in Example 1 except that each powder of tungstic acid ($H_2WO_4$) and cesium hydroxide (CsOH) was weighed at a ratio equivalent to Cs/W (molar ratio) =0.33/1.00.

Figure 8:
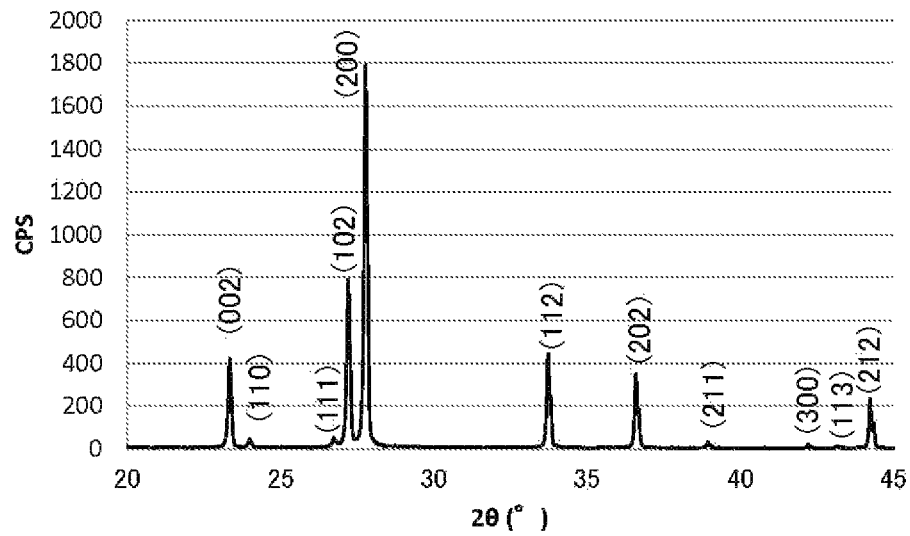
FIG. 8 is an X-ray diffraction profile of powder H according to comparative example 1.

The measurement results of powder H by X-ray diffraction method are shown in FIG. 8. From the obtained X-ray diffraction profile, powder H was found to be a hexagonal single phase. Accordingly, it was judged that Cs component and tungsten component were completely dissolved in the crystals of the hexagonal composite tungsten oxide fine particles.

20 mass % of powder H, 10 mass % of dispersant a, and 70 mass % MIBK were weighed. These were loaded into a paint shaker containing 0.3 mm φ ZrO$_2$ beads, and pulverized/dispersed for 12 hours to obtain a heat ray shielding fine particle dispersion liquid (hereinafter abbreviated as "dispersion liquid H"). The average dispersed particle size of the heat ray shielding fine particles in the dispersion liquid H was measured and found to be 29 nm.

Dispersion liquid H was appropriately diluted with MIBK and placed in a rectangular container having a thickness of 10 mm, and the spectral transmittance was measured. From the transmittance profile of dispersion liquid H when measured by adjusting a dilution ratio so that the visible light transmittance was 85%, it was found that the average value of the transmittance at a wavelength of 800 to 900 nm was 21.7%, the average value of the transmittance at a wavelength of 1200 to 1500 nm was 10.9%, and the transmittance at a wavelength of 2100 nm was 22.3%.

Composite tungsten oxide fine particle dispersed powder (hereinafter abbreviated as dispersed powder H) was obtained in the same manner as in Example 1 except that dispersant a was further added to dispersion liquid H.

The heat ray shielding sheet (hereinafter abbreviated as sheet H) of Comparative Example 1 was obtained in the same manner as in Example 1 except that dispersed powder H was used.

The above-described visible light transmittance of sheet H was 70%.

When the optical properties of sheet H were measured, it was found, from the transmission profile, that the average value of the transmittance at a wavelength of 800 to 900 nm was 8.5%, the average value of the transmittance at a wavelength of 1200 to 1500 nm was 2.8%, the transmittance at a wavelength of 2100 nm was 4.5%, and the haze was 1.0%. The evaluation results of sheet H are shown in Table 2.

Example 8

(Heat Ray Shielding Sheet Prepared by Using Heat Ray Shielding Master Batch)

The dispersed powder A prepared in Example 1 and a polycarbonate resin pellet were mixed so that the concentration of the composite tungsten oxide fine particles was 2.0 mass %, and a mixture was uniformly mixed using a blender to form a mixture. The mixture was melt-kneaded at 290° C. using a twin-screw extruder, and an extruded strand was cut into pellets, to obtain a master batch (hereinafter abbreviated as "master batch A") of Example 8 for a heat ray shielding transparent resin molded product.

A prescribed amount of master batch A was added to the polycarbonate resin pellets to prepare a composition for producing the heat ray shielding sheet of Example 8. Note that the predetermined amount is an amount to obtain 70% visible light transmittance of the heat ray shielding sheet (2.0 mm thickness) to be produced.

The composition for producing the heat ray shielding sheet of Example 8 was kneaded at 280° C. using a twin screw extruder, extruded from a T die, and a heat ray shielding sheet (hereinafter abbreviated as sheet I) of Example 8 was obtained as a sheet material having a thickness of 2.0 mm, by a calendar roll method.

The above-described visible light transmittance of the sheet I was 70%.

When the optical properties of sheet I were measured, it was found, from the transmission profile, that the average value of the transmittance at a wavelength of 800 to 900 nm was 19.6%, the average value of the transmittance at a wavelength of 1200 to 1500 nm was 1.8%, the transmittance at a wavelength of 2100 nm was 2.2%, and the haze was 1.1%. The evaluation results of sheet I are shown in Table 3.

Example 9

(Heat Ray Shielding Sheet Prepared by Using Heat Ray Shielding Master Batch)

A master batch (hereinafter abbreviated as "master batch B") of Example 9 was obtained in the same manner as in Example 8 except that the dispersed powder B prepared by Example 2 was used.

A heat ray shielding sheet (hereinafter abbreviated as sheet J) of Example 9 was obtained in the same manner as in Example 8 except that master batch B was used.

The above-described visible light transmittance of the sheet J was 70%.

When the optical properties of sheet J were measured, it was found, from the transmission profile, that the average value of the transmittance at a wavelength of 800 to 900 nm was 39.3%, the average value of the transmittance at a wavelength of 1200 to 1500 nm was 7.0%, the transmittance at a wavelength of 2100 nm was 2.4%, and the haze was 1.1%. The evaluation results of sheet J are shown in Table 3.

Example 10

(Heat Ray Shielding Sheet Prepared by Using Heat Ray Shielding Master Batch)

A master batch (hereinafter abbreviated as "master batch C") of Example 10 was obtained in the same manner as in Example 8 except that dispersed powder C prepared by Example 3 was used.

The heat ray shielding sheet (hereinafter abbreviated as sheet K) of Example 10 was obtained in the same manner as in Example 8 except that master batch C was used.

The above-described visible light transmittance of sheet K was 70%.

When the optical properties of sheet K were measured, it was found, from the transmission profile, that the average value of the transmittance at a wavelength of 800 to 900 nm was 34.3%, the average value of the transmittance at a wavelength of 1200 to 1500 nm was 3.9%, the transmittance at a wavelength of 2100 nm was 1.4%, and the haze was 1.2%. The evaluation results of sheet K are shown in Table 3.

Example 11

(Heat Ray Shielding Sheet Prepared by Using Heat Ray Shielding Master Batch)

A master batch (hereinafter abbreviated as master batch D) of Example 11 was obtained in the same manner as in Example 8 except that dispersed powder D prepared in Example 4 was used.

A heat ray shielding sheet (hereinafter abbreviated as sheet L) of Example 11 was obtained in the same manner as in Example 8 except that master batch D was used.

The above-described visible light transmittance of the sheet L was 70%.

When the optical properties of sheet L were measured, it was found, from the transmission profile, that the average value of the transmittance at a wavelength of 800 to 900 nm was 38.6%, the average value of the transmittance at a wavelength of 1200 to 1500 nm was 5.0%, the transmittance at a wavelength of 2100 nm was 1.7%, and the haze was 1.0%. The evaluation results of sheet L are shown in Table 3.

Example 12

(Heat Ray Shielding Sheet Prepared by Using Heat Ray Shielding Master Batch)

A master batch (hereinafter abbreviated as master batch E) of Example 12 was obtained in the same manner as in Example 8 except that dispersed powder E prepared in Example 5 was used.

The heat ray shielding sheet (hereinafter abbreviated as sheet M) of Example 12 was obtained in the same manner as in Example 8 except that master batch E was used.

The above-described visible light transmittance of the sheet M was 70%.

When the optical properties of sheet M were measured, it was found, from the transmission profile, that the average value of the transmittance at a wavelength of 800 to 900 nm was 31.7%, the average value of the transmittance at a wavelength of 1200 to 1500 nm was 2.9%, the transmittance at a wavelength of 2100 nm was 1.3%, and the haze was 1.2%. The evaluation results of sheet M are shown in Table 3.

Example 13

(Heat Ray Shielding Sheet Prepared by Using Heat Ray Shielding Master Batch)

A master batch (hereinafter abbreviated as master batch F) of Example 13 was obtained in the same manner as in Example 8 except that dispersed powder F prepared in Example 6 was used.

A heat ray shielding sheet (hereinafter abbreviated as sheet N) of Example 13 was obtained in the same manner as in Example 8 except that master batch F was used.

The above-described visible light transmittance of the sheet N was 70%.

When the optical properties of sheet N were measured, it was found, from the transmission profile, that the average value of the transmittance at a wavelength of 800 to 900 nm was 24.2%, the average value of the transmittance at a wavelength of 1200 to 1500 nm was 1.8%, the transmittance at a wavelength of 2100 nm was 1.3%, and the haze was 1.1%. The evaluation results of sheet N are shown in Table 3.

Example 14

(Heat Ray Shielding Sheet Prepared by Using Heat Ray Shielding Master Batch)

A master batch (hereinafter abbreviated as master batch G) of Example 14 was obtained in the same manner as in Example 8 except that dispersed powder G prepared in Example 7 was used.

A heat ray shielding sheet (hereinafter abbreviated as sheet P) of Example 13 was obtained in the same manner as in Example 8 except that master batch G was used.

The above-described visible light transmittance of the sheet P was 70%.

When the optical properties of sheet P were measured, it was found, from the transmission profile, that the average value of the transmittance at a wavelength of 800 to 900 nm was 17.7%, the average value of the transmittance at a wavelength of 1200 to 1500 nm was 1.5%, the transmittance at a wavelength of 2100 nm was 1.9%, and the haze was 1.1%. The evaluation results of sheet P are shown in Table 3.

Comparative Example 2

(Heat Ray Shielding Sheet Prepared by Using Heat Ray Shielding Master Batch)

A master batch (hereinafter abbreviated as master batch H) of Comparative Example 2 was obtained in the same manner as in Example 8 except that the dispersed powder H prepared in Comparative Example 1 was used.

A heat ray shielding sheet (hereinafter abbreviated as sheet R) of Comparative Example 2 was obtained in the same manner as in Example 8 except that the master batch H was used.

The above-described visible light transmittance of the sheet R was 70%.

When the optical properties of sheet R were measured, it was found, from the transmission profile, that the average value of the transmittance at a wavelength of 800 to 900 nm was 8.6%, the average value of the transmittance at a wavelength of 1200 to 1500 nm was 2.9%, the transmittance at a wavelength of 2100 nm was 3.9%, and the haze was 1.0%. The evaluation results of sheet R are shown in Table 3.

Example 15

(Heat Ray Shielding Film and Heat Ray Shielding Laminated Transparent Substrate)

A triethylene glycol-di-2-ethylbutyrate plasticizer was added to a polyvinyl butyl resin and a mixture prepared such that the ratio by weight between the polyvinyl butyl resin and the plasticizer [polyvinyl butyl resin/plasticizer]=100/40. The dispersed powder A prepared in the Example 1 was added at a predetermined amount to the mixture, so as to prepare a composition for use in producing a heat ray shielding film. Note that the predetermined amount is an amount such that the visible light transmittance of the produced heat ray shielding laminated transparent substrate was 70%.

This composition for use in producing was kneaded and mixed for 30 minutes at 70° C. using a three-roll mixer to obtain a mixture. The temperature of the mixture was then raised to 180° C. in a mold extruder, and a heat ray shielding film of Example 15 produced by forming the mixture into a film having a thickness of about 1 mm and winding into a roll.

The heat ray shielding film of Example 15 was then cut into 10 cm×10 cm pieces, and sandwiched between two sheets of inorganic clear glass 3 mm thick of the same dimensions, to thereby form a laminated body. The laminated body was then placed in a rubber vacuum bag, and after removing the air from inside the bag and holding at 90° C. for 30 minutes, the laminated body was then returned to a normal temperature, and removed from the bag. The laminated body was then placed in an autoclave apparatus, and pressurized and heated to a pressure of 12 kg/cm$^2$ and a temperature of 140° C. for 20 minutes, to thereby prepare a heat ray shielding laminated glass sheet (hereafter, abbreviated as a laminated glass sheet A) of Example 7.

The above-described visible light transmittance of the laminated glass sheet A was 70.0%.

When the optical properties of the laminated glass sheet A were measured, it was found, from the transmission profile, that the average value of the transmittance at a wavelength of 800 to 900 nm was 17.8%, the average value of the transmittance at a wavelength of 1200 to 1500 nm was 1.9%, the transmittance at a wavelength of 2100 nm was 4.2%, and the haze was 1.6%. The evaluation results of the laminated glass sheet A are shown in Table 4.

Example 16

(Heat Ray Shielding Film and Heat Ray Shielding Laminated Transparent Substrate)

A heat ray shielding laminated glass sheet of Example 16 (hereinafter abbreviated as laminated glass sheet B) was prepared in the same manner as in Example 15 except that dispersed powder B was used.

The above-described visible light transmittance of the laminated glass sheet B was 70.0%.

When the optical properties of the laminated glass sheet B were measured, it was found, from the transmission profile, that the average value of the transmittance at a wavelength of 800 to 900 nm was 34.2%, the average value of the transmittance at a wavelength of 1200 to 1500 nm was 6.6%, the transmittance at a wavelength of 2100 nm was 4.6%, and the haze was 1.2%. The evaluation results of the laminated glass sheet B are shown in Table 4.

Example 17

(Heat Ray Shielding Film and Heat Ray Shielding Laminated Transparent Substrate)

A heat ray shielding laminated glass sheet of Example 17 (hereinafter abbreviated as a laminated glass sheet C) was prepared in the same manner as in Example 15 except that dispersed powder C was used.

The above-described visible light transmittance of the laminated glass sheet C was 70.0%.

When the optical properties of the laminated glass sheet C were measured, it was found, from the transmission profile, that the average value of the transmittance at a wavelength of 800 to 900 nm was 30.1%, the average value of the transmittance at a wavelength of 1200 to 1500 nm was 3.8%, the transmittance at a wavelength of 2100 nm was 2.8%, and the haze was 1.5%. The evaluation results of the laminated glass sheet C are shown in Table 4.

Example 18

(Heat Ray Shielding Film and Heat Ray Shielding Laminated Transparent Substrate)

A heat ray shielding laminated glass sheet of Example 18 (hereinafter, abbreviated as a laminated glass sheet D) was prepared in the same manner as in Example 15 except that dispersed powder D was used.

The above-described visible light transmittance of the laminated glass sheet D was 70.0%.

When the optical properties of the laminated glass sheet D were measured, it was found, from the transmission profile, that the average value of the transmittance at a wavelength of 800 to 900 nm was 33.6%, the average value of the transmittance at a wavelength of 1200 to 1500 nm was 4.9%, the transmittance at a wavelength of 2100 nm was 3.4%, and the haze was 1.4%. The evaluation results of the laminated glass sheet D are shown in Table 4.

Example 19

(Heat Ray Shielding Film and Heat Ray Shielding Laminated Transparent Substrate)

A heat ray shielding laminated glass sheet of Example 19 (hereinafter abbreviated as a laminated glass sheet E) was prepared in the same manner as in Example 15, except that dispersed powder E was used.

The above-described visible light transmittance of the laminated glass sheet E was 70.0%.

When the optical properties of the laminated glass sheet E were measured, it was found, from the transmission profile, that the average value of the transmittance at a wavelength of 800 to 900 nm was 28.0%, the average value of the transmittance at a wavelength of 1200 to 1500 nm was 2.9%, the transmittance at a wavelength of 2100 nm was 2.5%, and the haze was 1.6%. The evaluation results of the laminated glass sheet E are shown in Table 4.

Example 20

(Heat Ray Shielding Film and Heat Ray Shielding Laminated Transparent Substrate)

A heat ray shielding laminated glass sheet of Example 20 (hereinafter abbreviated as a laminated glass sheet F) was prepared in the same manner as in Example 15 except that dispersed powder F was used.

The above-described visible light transmittance of the laminated glass sheet F was 70%.

When the optical properties of the laminated glass sheet F were measured, it was found, from the transmission profile, that the average value of the transmittance at a wavelength of 800 to 900 nm was 21.7%, the average value of the transmittance at a wavelength of 1200 to 1500 nm was 1.8%, the transmittance at a wavelength of 2100 nm was 2.5%, and the haze was 1.6%. The evaluation results of the laminated glass sheet F are shown in Table 4.

Example 21

(Heat Ray Shielding Film and Heat Ray Shielding Laminated Transparent Substrate)

A heat ray shielding laminated glass sheet of Example 21 (hereinafter abbreviated as a laminated glass sheet G) was prepared in the same manner as in Example 15 except that dispersed powder G was used.

The above-described visible light transmittance of the laminated glass sheet G was 70.0%.

When the optical properties of the laminated glass sheet G were measured, it was found, from the transmission profile, that the average value of the transmittance at a wavelength of 800 to 900 nm was 16.1%, the average value of the transmittance at a wavelength of 1200 to 1500 nm was 1.5%, the transmittance at a wavelength of 2100 nm was 3.8%, and the haze was 1.4%. The evaluation results of the laminated glass sheet G are shown in Table 4.

Comparative Example 3

(Heat Ray Shielding Film and Heat Ray Shielding Laminated Transparent Substrate)

A heat ray shielding laminated glass sheet (hereinafter abbreviated as a laminated glass sheet H) of Comparative Example 3 was prepared in the same manner as in Example 15 except that dispersed powder H was used.

The above-described visible light transmittance of the laminated glass sheet H was 70.0%.

When the optical properties of the laminated glass sheet G were measured, it was found, from the transmission profile, that the average value of the transmittance at a wavelength of 800 to 900 nm was 8.1%, the average value of the transmittance at a wavelength of 1200 to 1500 nm was 2.9%, the transmittance at a wavelength of 2100 nm was 7.3%, and the haze was 1.8%. The evaluation results of the laminated glass sheet H are shown in Table 4.

Evaluation of Examples 1 to 21 and Comparative Examples 1 to 3

In the heat ray shielding sheets of Examples 1 to 14 and the heat ray shielding laminated glass sheets of Examples 15 to 21, when the visible light transmittance is 85%, the average value of the transmittance of the near-infrared light at a wavelength of 800 to 900 nm is high, and the transmittance at a wavelength of 1200 to 1800 nm and at a wavelength of 2100 nm is low, compared with the heat ray shielding sheet of Comparative Examples 1 and 2 and the heat ray shielding laminated glass sheet of Comparative Example 3 in which the conventional composite tungsten oxide fine particles are used. From these results it is found that the composite tungsten oxide fine particle dispersion body using the composite tungsten oxide fine particles containing one or more elements M selected from Cs, K and Tl and one or more elements N selected from Rb and Tl (wherein element M and element N are different) and having a hexagonal crystal structure, can secure a high transmittance of near-infrared light at a wavelength of 800 nm to 900 nm while reducing a scorching sensation on the skin.

TABLE 1

| | Composition | Solvent | Dispersant | Dispersion liquid | VLT (%) | *1 800-900 nm (%) | *1 1200-1500 nm (%) | *2 2100 nm (%) |
|---|---|---|---|---|---|---|---|---|
| Example 1 | Rb/Cs/W = 0.30/0.03/1.00 | MIBK | a | A | 85.0 | 37.1 | 8.2 | 15.2 |
| Example 2 | Rb/K/W = 0.10/0.23/1.00 | MIBK | a | B | 85.0 | 58.3 | 19.4 | 16.2 |
| Example 3 | Rb/K/W = 0.20/0.13/1.00 | MIBK | a | C | 85.0 | 53.3 | 13.2 | 11.5 |
| Example 4 | Cs/K/W = 0.05/0.28/1.00 | MIBK | a | D | 85.0 | 57.7 | 15.7 | 13.3 |
| Example 5 | Cs/K/W = 0.10/0.23/1.00 | MIBK | a | E | 85.0 | 50.7 | 10.9 | 10.7 |
| Example 6 | Cs/K/W = 0.20/0.13/1.00 | MIBK | a | F | 85.0 | 42.5 | 8.0 | 10.7 |
| Example 7 | Cs/K/W = 0.25/0.08/1.00 | MIBK | a | G | 85.0 | 34.6 | 7.0 | 14.1 |
| *3 | Cs/W = 0.33/1.00 | MIBK | a | H | 85.0 | 21.7 | 10.9 | 22.3 |

*1 Transmittance (average value)
*2 Transmittance
*3 Comparative example 1

Dispersant a: An acrylic polymer dispersant (amine value 48 mg KOH/g, decomposition temperature 250° C.) having a group containing amine as a functional group.

TABLE 2

| | Composition | Sheet | VLT (%) | *1 800-900 nm (%) | *1 1200-1500 nm (%) | *2 2100 nm (%) | Haze (%) |
|---|---|---|---|---|---|---|---|
| Example 1 | Rb/Cs/W = 0.30/0.03/1.00 | A | 70.0 | 19.6 | 1.8 | 2.5 | 1.0 |
| Example 2 | Rb/K/W = 0.10/0.23/1.00 | B | 70.0 | 39.2 | 7.0 | 2.7 | 1.2 |
| Example 3 | Rb/K/W = 0.20/0.13/1.00 | C | 70.0 | 34.2 | 3.9 | 1.6 | 1.1 |
| Example 4 | Cs/K/W = 0.05/0.28/1.00 | D | 70.0 | 38.6 | 5.0 | 2.0 | 1.0 |
| Example 5 | Cs/K/W = 0.10/0.23/1.00 | E | 70.0 | 31.7 | 2.9 | 1.4 | 1.0 |
| Example 6 | Cs/K/W = 0.20/0.13/1.00 | F | 70.0 | 24.2 | 1.8 | 1.4 | 1.1 |
| Example 7 | Cs/K/W = 0.25/0.08/1.00 | G | 70.0 | 17.6 | 1.5 | 2.2 | 1.2 |
| *3 | Cs/W = 0.33/1.00 | H | 70.0 | 8.5 | 2.8 | 4.5 | 1.0 |

*1 Transmittance (average value)
*2 Transmittance
*3 Comparative Example 1

TABLE 3

| | Composition | Master batch | Sheet | VLT (%) | *1 800-900 nm (%) | *1 1200-1500 nm (%) | *2 2100 nm (%) | Haze (%) |
|---|---|---|---|---|---|---|---|---|
| Example 8 | Rb/Cs/W = 0.30/0.03/1.00 | A | I | 70.0 | 19.6 | 1.8 | 2.2 | 1.1 |
| Example 9 | Rb/K/W = 0.10/0.23/1.00 | B | J | 70.0 | 39.3 | 7.0 | 2.4 | 1.1 |
| Example 10 | Rb/K/W = 0.20/0.13/1.00 | C | K | 70.0 | 34.3 | 3.9 | 1.4 | 1.2 |
| Example 11 | Cs/K/W = 0.05/0.28/1.00 | D | L | 70.0 | 38.6 | 5.0 | 1.7 | 1.0 |
| Example 12 | Cs/K/W = 0.10/0.23/1.00 | E | M | 70.0 | 31.7 | 2.9 | 1.3 | 1.2 |
| Example 13 | Cs/K/W = 0.20/0.13/1.00 | F | N | 70.0 | 24.2 | 1.8 | 1.3 | 1.1 |
| Example 14 | Cs/K/W = 0.25/0.08/1.00 | G | P | 70.0 | 17.7 | 1.5 | 1.9 | 1.1 |
| *3 | Cs/W = 0.33/1.00 | H | R | 70.0 | 8.6 | 2.9 | 3.9 | 1.0 |

*1 Transmittance (average value)
*2 Transmittance
*3 Comparative Example 2

TABLE 4

|  | Composition | *1 | VLT (%) | *2 800-900 nm (%) | *2 1200-1500 nm (%) | *3 2100 nm (%) | Haze (%) |
|---|---|---|---|---|---|---|---|
| Example 15 | Rb/Cs/W = 0.30/0.03/1.00 | A | 70.0 | 17.8 | 1.9 | 4.2 | 1.6 |
| Example 16 | Rb/K/W = 0.10/0.23/1.00 | B | 70.0 | 34.2 | 6.6 | 4.6 | 1.2 |
| Example 17 | Rb/K/W = 0.20/0.13/1.00 | C | 70.0 | 30.1 | 3.8 | 2.8 | 1.5 |
| Example 18 | Cs/K/W = 0.05/0.28/1.00 | D | 70.0 | 33.6 | 4.9 | 3.4 | 1.4 |
| Example 19 | Cs/K/W = 0.10/0.23/1.00 | E | 70.0 | 28.0 | 2.9 | 2.5 | 1.6 |
| Example 20 | Cs/K/W = 0.20/0.13/1.00 | F | 70.0 | 21.7 | 1.8 | 2.5 | 1.6 |
| Example 21 | Cs/K/W = 0.25/0.08/1.00 | G | 70.0 | 16.1 | 1.5 | 3.8 | 1.4 |
| *4 | Cs/W = 0.33/1.00 | H | 70.0 | 8.1 | 2.9 | 7.3 | 1.8 |

*1 Laminated glass sheet
*2 Transmittance (average value)
*3 Transmittance
*4 Comparative Example 3

The invention claimed is:

1. A heat ray shielding fine particle dispersion body containing a transparent thermoplastic resin, and in which heat ray shielding fine particles of a composite tungsten oxide are dispersed in the transparent thermoplastic resin, the heat ray shielding fine particles having elements L and M, tungsten, and oxygen, and a hexagonal crystal structure represented by a general formula $L_A M_B W_C O_D$,
   wherein the element L is an element selected from K, Rb, Cs,
   the element M is one or more elements selected from K, Rb, and Cs and is different from the element L,
   an atomic ratio of the elements L, M and tungsten is $0.33 \leq (A+B)/C \leq 0.35$, and
   a value of D is any value as long as the composite tungsten oxide has the hexagonal crystal structure.

2. The heat ray shielding fine particle dispersion body according to claim 1, containing the heat ray shielding fine particles in which when a visible light transmittance is 85% when computed for light absorption by the heat ray shielding fine particles alone, an average value of transmittance at a wavelength of 800 nm to 900 nm is 30% or more and 60% or less, and an average value of transmittance at a wavelength of 1200 nm to 1500 nm is 20% or less, and a transmittance at a wavelength of 2100 nm is 22% or less.

3. The heat ray shielding fine particle dispersion body according to claim 1, wherein the transparent thermoplastic resin is any one of:
   one resin selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene·vinyl acetate copolymer, polyvinyl acetal resin,
   a mixture of two or more resins selected from the above resin group, or
   a copolymer of two or more resins selected from the above resin group.

4. The heat ray shielding fine particle dispersion body according to claim 1, wherein a content of the heat ray shielding fine particles is 0.5 mass% or more and 80 mass% or less.

5. The heat ray shielding fine particle dispersion body according to claim 1, wherein the heat ray shielding fine particle dispersion body is formed in a sheet shape, a board shape, or a film shape.

6. The heat ray shielding fine particle dispersion body according to claim 1, wherein a content of the heat ray shielding fine particles contained in the heat ray shielding fine particle dispersion body per unit projected area is 0.1 g/m² or more and 5.0 g/m² or less.

7. The heat ray shielding fine particle dispersion body according to claim 1, wherein when a visible light transmittance is 70%, an average value of transmittance at a wavelength of 800 nm to 900 nm is 10% or more and 45% or less, and an average value of transmittance at a wavelength of 1200 nm to 1500 nm is 8% or less, and a transmittance at a wavelength of 2100 nm is 5% or less.

8. A heat ray shielding laminated transparent substrate, wherein the heat ray shielding fine particle dispersion body of claim 1 is present between a plurality of transparent substrates.

9. The heat ray shielding laminated transparent substrate according to claim 8, wherein when a visible light transmittance is 70%, an average value of transmittance at a wavelength of 800 nm to 900 nm is 10% or more and 45% or less, and an average value of transmittance at a wavelength of 1200 nm to 1500 nm is 8% or less, and transmittance at a wavelength of 2100 nm is 8.0% or less.

10. A method for producing a heat ray shielding fine particle dispersion body comprising a step of obtaining a heat ray shielding fine particle dispersion body by uniformly mixing heat ray shielding fine particles of a composite tungsten oxide in a transparent thermoplastic resin, the heat ray shielding fine particles having elements L, M, tungsten, and oxygen, and a hexagonal crystal structure represented by a general formula $L_A M_B W_C O_D$,
   wherein the element L is an element selected from K, Rb, Cs,
   the element M is one or more elements selected from K, Rb, and Cs and is different from the element L,
   an atomic ratio of the elements L, M and tungsten is $0.33 \leq (A+B)/C \leq 0.35$, and
   a value of D is any value as long as the composite tungsten oxide has the hexagonal crystal structure.

11. A method for producing a heat ray shielding laminated transparent substrate, comprising a step of sandwiching the heat ray shielding fine particle dispersion body between transparent substrates, the heat ray shielding fine particle dispersion body being produced by the method of claim 10.

12. A method for producing a heat ray shielding laminated transparent substrate, comprising a step of molding the heat ray shielding fine particle dispersion body produced by the method of claim 10, into a film shape or a board shape.

13. The heat ray shielding fine particle dispersion body according to claim 1, wherein the atomic ratio of the elements L, M and tungsten is $(A+B)/C=0.33$.

14. The method for producing a heat ray shielding laminated transparent substrate according to claim 10, wherein the atomic ratio of the elements L, M and tungsten is (A+B)/C=0.33.

\* \* \* \* \*